United States Patent
Paris et al.

(10) Patent No.: US 12,165,034 B2
(45) Date of Patent: Dec. 10, 2024

(54) CONTROLLING A NEURAL NETWORK THROUGH INTERMEDIATE LATENT SPACES

(71) Applicant: Adobe Inc., San Jose, CA (US)

(72) Inventors: Sylvain Philippe Paris, Jamaica Plain, MA (US); Erik Andreas Härkönen, Helsinki (FI); Aaron Phillip Hertzmann, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/301,887

(22) Filed: Apr. 17, 2023

(65) Prior Publication Data

US 2023/0342592 A1 Oct. 26, 2023

Related U.S. Application Data

(63) Continuation of application No. 16/798,263, filed on Feb. 21, 2020, now Pat. No. 11,657,255.

(51) Int. Cl.
*G06N 3/045* (2023.01)
*G06N 3/08* (2023.01)

(52) U.S. Cl.
CPC ............ *G06N 3/045* (2023.01); *G06N 3/08* (2013.01)

(58) Field of Classification Search
CPC .......... G06N 3/02; G06N 3/0454; G06N 3/08; G06T 2207/20084
See application file for complete search history.

(56) References Cited

U.S. PATENT DOCUMENTS

| | | |
|---|---|---|
| 10,909,746 B1 | 2/2021 | Kantar et al. |
| 11,042,758 B2 | 6/2021 | Jaipuria et al. |
| 11,657,255 B2 | 5/2023 | Paris et al. |
| 11,694,064 B1 * | 7/2023 | Gou ................... G06V 10/764 706/15 |
| 2015/0030237 A1 | 1/2015 | Jancsary et al. |

(Continued)

FOREIGN PATENT DOCUMENTS

EP 3410392 A1 12/2018

OTHER PUBLICATIONS 2020148.9 , "Foreign Office Action", GB Application No. 2020148.9, Sep. 6, 2023, 3 pages.

(Continued)

*Primary Examiner* — Antonio A Caschera
(74) *Attorney, Agent, or Firm* — FIG. 1 Patents

(57) ABSTRACT

A generative neural network control system controls a generative neural network by modifying the intermediate latent space in the generative neural network. The generative neural network includes multiple layers each generating a set of activation values. An initial layer (and optionally additional layers) receives an input latent vector, and a final layer outputs an image generated based on the input latent vector. The data that is input to each layer (other than the initial layer) is referred to as data in an intermediate latent space. The data in the intermediate latent space includes activation values (e.g., generated by the previous layer or modified using various techniques) and optionally a latent vector. The generative neural network control system modifies the intermediate latent space to achieve various different effects when generating a new image.

20 Claims, 19 Drawing Sheets

(56) References Cited

U.S. PATENT DOCUMENTS

| | | |
|---|---|---|
| 2018/0144214 A1 | 5/2018 | Hsieh et al. |
| 2019/0035113 A1 | 1/2019 | Salvi et al. |

OTHER PUBLICATIONS

"Combined Search and Examination Report", GB Application No. 2020148.9, Jun. 17, 2021, 8 pages.

"Foreign Notice of Acceptance", AU Application No. AU2020289806, Nov. 22, 2021, 4 pages.

"Foreign Office Action", Application No. AU2020289806, Aug. 18, 2021, 7 pages.

"Foreign Office Action", Application No. AU2020289806, Sep. 20, 2021, 6 pages.

"Foreign Office Action", AU Application No. AU2020289806, Oct. 21, 2021, 5 pages.

U.S. Appl. No. 16/798,263, "Corrected Notice of Allowability", U.S. Appl. No. 16/798,263, filed Apr. 18, 20230, 4 pages.

U.S. Appl. No. 16/798,263, "Non-Final Office Action", U.S. Appl. No. 16/798,263, filed Sep. 12, 2022, 6 pages.

U.S. Appl. No. 16/798,263, "Notice of Allowance", U.S. Appl. No. 16/798,263, filed Jan. 11, 2023, 8 pages.

2020148.9, "Foreign Office Action", GB Application No. 2020148.9, Mar. 3, 2023, 5 pages.

Antipov, Grigory, et al., "Face Aging with Conditional Generative Adversarial Networks", 2017 IEEE International Conference on Image Processing (ICIP) [retrieved Aug. 23, 2021]. Retrieved from the Internet <https://doi.org/10.1109/ICIP.2017.8296650>., Sep. 2017, 5 pages.

Brock, Andrew, et al., "Neural Photo Editing with Introspective Adversarial Networks", Cornell University arXiv, arXiv.org [retrieved Jan. 21, 2022]. Retrieved from the Internet <https://arxiv.org/pdf/1609.07093.pdf>., Feb. 6, 2017, 15 pages.

Cho, Wonwoong, et al., "What and Where to Translate: Local Mask-based Image-to-Image Translation", Cornell University, arXiv, arXiv.org [retrieved Sep. 28, 2021]. Retrieved from the Internet <https://arxiv.org/pdf/1906.03598.pdf>., Jun. 9, 2019, 7 pages.

Goetschalckx, Lore, et al., "GANalyze: Toward Visual Definitions of Cognitive Image Properties", Jun. 24, 2019, 17 pages.

Jahanian, Ali, et al., "On the "steerability" of generative adversarial networks", Cornell University arXiv, arXiv.org [retrieved Jan. 27, 2022]. Retrieved from the Internet <https://arxiv.org/pdf/1907.07171.pdf>., Feb. 17, 2020, 31 Pages.

Kaneko, Takuhiro, et al., "Generative Attribute Controller with Conditional Filtered Generative Adversarial Networks", 2017 IEEE Conference on Computer Vision and Pattern Recognition (CVPR) [retrieved Sep. 28, 2021]. Retrieved from the Internet <https://openaccess.thecvf.com/content_cvpr_2017/papers/Kaneko_Generative_Attribute_Controller_CVPR_2017_paper.pdf>., Jul. 2017, 10 pages.

Karras, Tero, et al., "A Style-Based Generator Architecture for Generative Adversarial Networks", Cornell University arXiv, arXiv.org [retrieved Jun. 28, 2023]. Retrieved from the Internet <https://arxiv.org/pdf/1812.04948.pdf>., Mar. 29, 2019, 12 pages.

Miyato, Takeru, et al., "cGANs with Projection Discriminator", Cornell University arXiv, arXiv.org [retrieved Sep. 7, 2022]. Retrieved from the Internet <https://arxiv.org/pdf/1802.05637.pdf>., Aug. 15, 2018, 21 pages.

Pai, Sharan, et al., "User Input Based Style Transfer While Retaining Facial Attributes", 2019 IEEE Fifth International Conference on Multimedia Big Data (BigMM) [retrieved Sep. 28, 2021]. Retrieved from the Internet <https://doi.org/10.1109/BigMM.2019.00-41>., Sep. 2019, 9 pages.

Shen, Yujun, et al., "Interpreting the Latent Space of GANs for Semantic Face Editing", Cornell University arXiv, arXiv.org [retrieved Feb. 20, 2023]. Retrieved from the Internet <https://arxiv.org/pdf/1907.10786.pdf>., Nov. 26, 2019, 20 pages.

Suzuki, Ryohei, et al., "Spatially Controllable Image Synthesis with Internal Representation Collaging", Cornell University arXiv, arXiv.org [retrieved Jan. 25, 2022]. Retrieved from the Internet <https://arxiv.org/pdf/1811.10153.pdf>., Apr. 9, 2019, 14 pages.

Upchurch, Paul, "Deep Feature Interpolation for Image Content Changes", Jun. 19, 2017, 10 pages.

202011410602.6, "Foreign Office Action", CN Application No. 202011410602.6, Jul. 26, 2024, 13 pages.

* cited by examiner

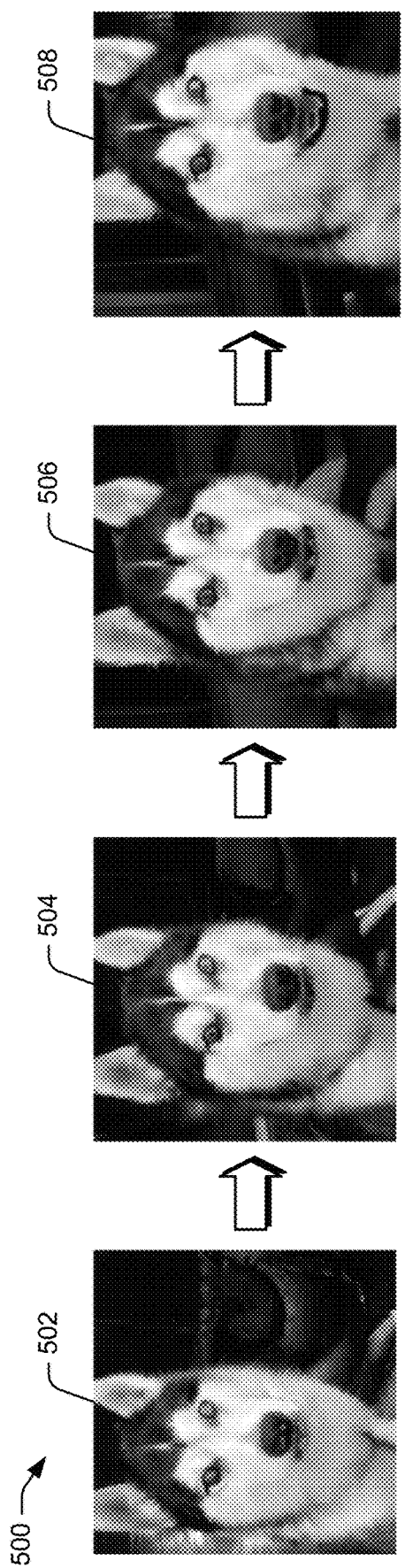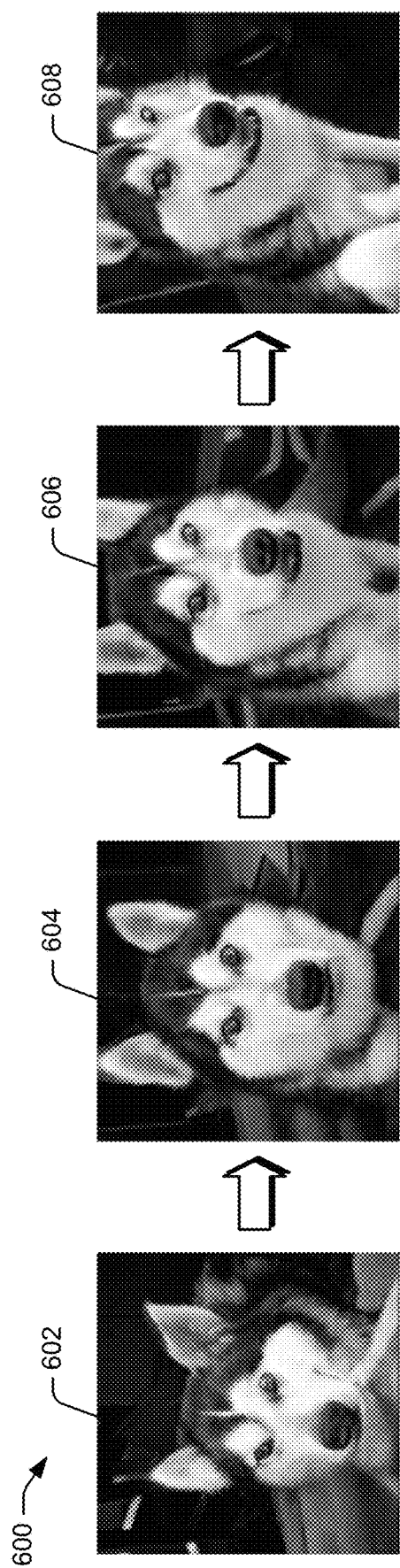

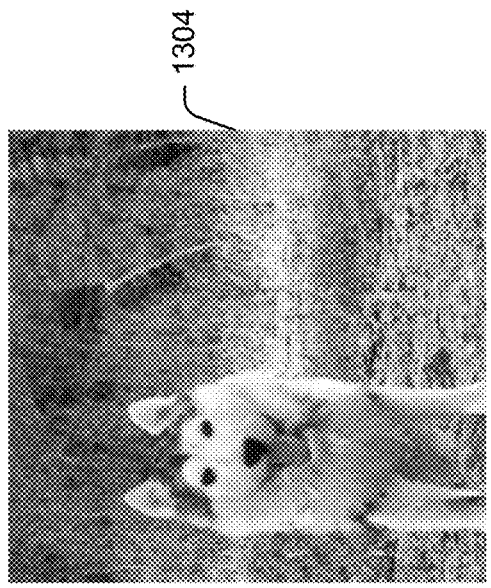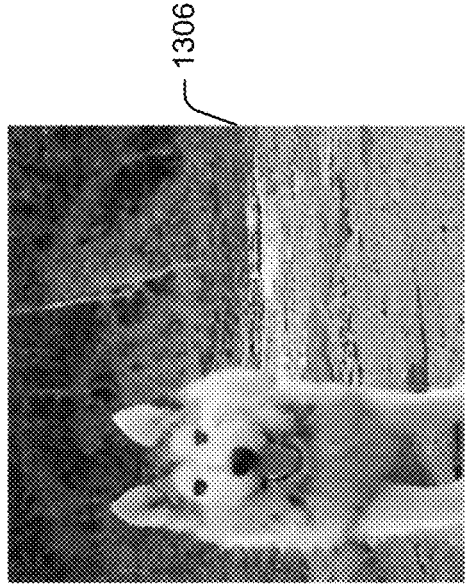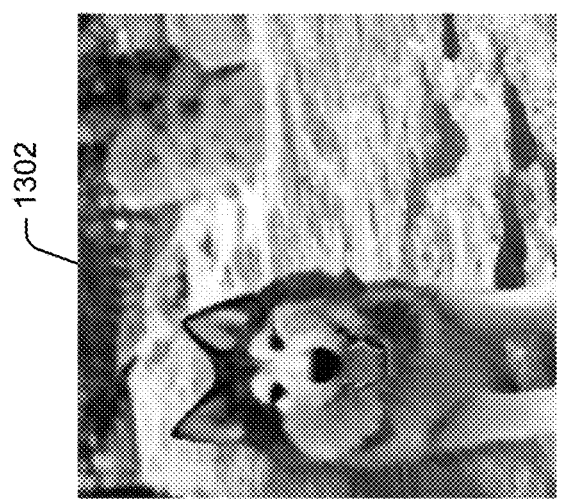
Fig. 13

CONTROLLING A NEURAL NETWORK THROUGH INTERMEDIATE LATENT SPACES

RELATED APPLICATION

This application is a continuation of U.S. patent application Ser. No. 16/798,263, filed Feb. 21, 2020, entitled "Controlling A Neural Network Through Intermediate Latent Spaces," the disclosure of which is hereby incorporated by reference herein in its entirety.

BACKGROUND

As computer technology has advanced, a wide range of uses and applications of computers have evolved. One recent advancement is generative neural networks, such as generative adversarial networks (GANs), which can generate images from initial inputs that are typically random. These generative neural networks can be provided as part of various digital content creation applications and provide many benefits, such as generation of images that can be difficult to distinguish from images captured by a camera.

Despite these benefits, generative neural networks are not without their problems. One such problem is that it can be difficult to control the output of a generative neural network. Conventional attempts to control the output of the generative neural network include providing as part of the input to the initial layer of the generative neural network a class vector indicating a class of image to generate, providing additional data to be used as at least part of the input to the initial layer, and so forth. However, these attempts produce limited results. Providing a class vector allows control over what class of image is generated (e.g., a dog, a cat, a landscape), but does not provide any further control (e.g., the direction from which a dog is viewed, a background of the image). Providing additional data to be used as at least part of the input to the initial layer can be problematic because obtaining the additional data can be difficult and the results of using such additional data are limited. For example, a user may obtain an additional image looking at a dog from a particular direction (e.g., looking at the dog's side) and provide that additional image as part of the input to the initial layer of the generative neural network, which may generate a dog turned somewhat as in the additional image.

Conventional solutions thus provide limited control over the images generated by generative neural networks, resulting in user dissatisfaction and frustration with their computers and image generation systems.

SUMMARY

To mitigate the drawbacks of conventional image generation systems, a generative neural network control system is described to control a neural network through intermediate latent spaces. In one or more implementations, first data for a generator network of a generative adversarial network (GAN) is received, the generator network including multiple layers. These multiple layers include an initial layer, a first layer and a second layer. An input selection of a first effect for a new image being generated by the generator network is received. Second data is generated by modifying the first data based on the input selection. The modifying comprises applying decomposition vectors to the activation values generated by the first layer. The second data is provided to the second layer, the second layer being a later layer in the generator network than the first layer. Using the generator network with the second data, the new image with the first effect is generated.

In one or more implementations, first data for a generator network of a generative adversarial network (GAN) is received, the generator network including multiple layers. These multiple layers include an initial layer, a first layer and a second layer. An input selection of a first effect for a new image being generated by the generator network is received. Second data is generated based on the first data and the input selection. The second data is generated based on modifying activation values generated by the first layer and modifying a latent vector input to the initial layer. The second data is provided to the second layer, the second layer being a later layer in the generator network than the first layer. Using the generator network with the second data, the new image with the first effect is generated.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 5 illustrates an example of a translation effect.

FIG. 6 illustrates an example of a camera motion effect.

FIG. 13 illustrates an example of changing the style of a generated image.

DETAILED DESCRIPTION

Overview

Figure 1:
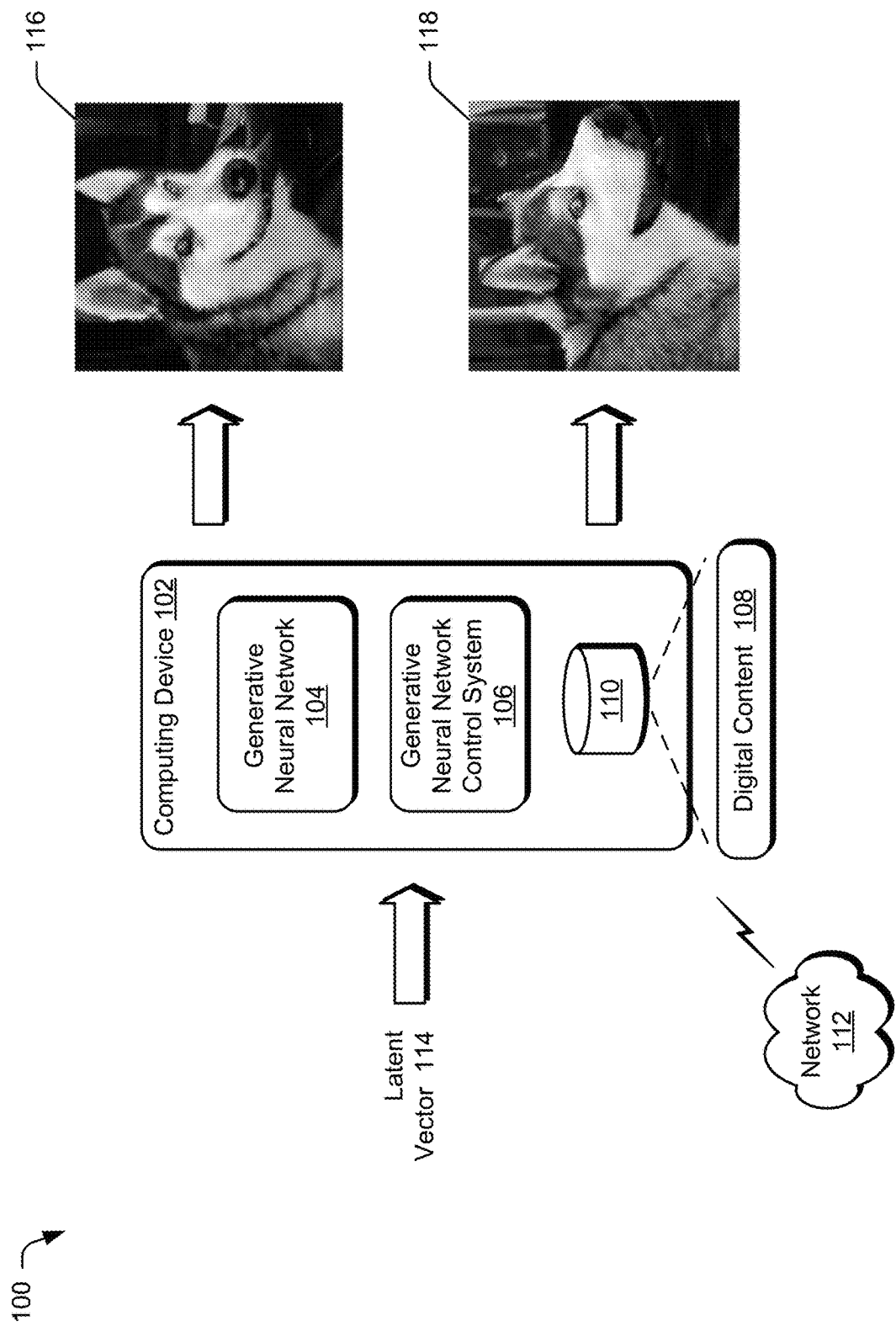
FIG. 1 is an illustration of a digital medium environment in an example implementation that is operable to employ the controlling a neural network through intermediate latent spaces described herein.

Current attempts to control images generated by a generative neural network, such as a GAN, involve controlling the input to the initial layer of the generative neural network. For example, these attempts are limited to identifying a class of image to be generated (e.g., a dog, a cat, a landscape) or providing additional data to be used as at least part of the input to the initial layer (e.g., an additional image looking at a dog from a particular direction). These attempts, however, provide minimal control of the images generated by the generative neural network and can be problematic due to the need to obtain the additional data.

To overcome these problems, controlling a neural network through intermediate latent spaces techniques are discussed herein. Generally, in accordance with one or more implementations, a generative neural network includes multiple layers each generating a set of activation values. An initial layer (and optionally additional layers), also referred to as an input layer, receives an input latent vector. A final layer, also referred to as an output layer, outputs an image generated based on the input latent vector. The data that is input to each layer (other than the initial layer) is referred to as data in an intermediate latent space. The data in the intermediate latent space includes activation values (e.g., generated by the previous layer or modified using various techniques) and optionally a latent vector. The techniques discussed herein modify the intermediate latent space to achieve various different effects when generating a new image.

The intermediate latent space is modified by performing splicing or blending operations in spatial regions of the layer or globally across a given layer. This splicing or blending can include interpolating values, selecting from different parts of input values, adding or subtracting values (e.g., based on decomposition as discussed below), and so forth. By performing splicing and blending operations in spatial regions or globally across a given layer, a user can affect the output in a wide range of ways. Further, by choosing the layer at which to edit, the user can control how global or local the changes are.

In one or more implementations, a decomposition technique (e.g., Principal Component Analysis) is used to generate a set of decomposition vectors (e.g., eigenvectors) for a particular intermediate latent space. The decomposition vectors are generated by providing a particular number (e.g., on the order of 10,000 to 100,000) of different latent vectors to the generative neural network and generating a set of activation values from a particular layer of the generative neural network. The particular layer can vary based on whether a more global effect on the generated image or a more local effect on the generated image is desired.

Using decomposition, each set of activation values generated by the particular layer are unrolled (converted) into an activation vector and these activation vectors are analyzed using any of a variety of different public or proprietary techniques to generate multiple decomposition vectors. For example, each of these activation vectors represents a point in a multi-dimensional space (equal to the number of dimensions each vector has). These points create a point cloud in the multi-dimensional space and various techniques can be used to determine which directions that point cloud is most extended (the directions for which the point cloud has the most variance). Vectors indicating these directions of most extension (variance) are the generated decomposition vectors. For example, Principal Component Analysis can be performed on the activation values to generate multiple eigenvectors.

A low number of decomposition vectors (principal components), such as on the order of tens or hundreds, explain most of the variance of a given layer. These decomposition vectors map well to semantic properties of the output image such as object position and orientation, camera pose, and so forth. The techniques discussed herein use the decomposition vectors to control the geometric properties of the generated image while keeping the style consistent. Additionally or alternatively, output simplification and artifact removal can be performed by projecting the activations onto a small number of principal components. Style can also optionally be changed by varying the latent vector input to the intermediate latent space.

In one or more implementations, each layer of the generative neural network receives as input a latent vector. In such situations, as part of the decomposition technique the latent vector is appended to the activation vector (the activation vector and the latent vector are concatenated) and the decomposition vectors are generated based on the set of appended activation values and latent vectors.

In one or more implementations, the decomposition vectors are used to modify the activation values generated by one layer of the generative neural network, and the modified activation values are provided as input to the next layer of the generative neural network. Each decomposition vector corresponds to a different effect on the image being generated by the generative neural network. For example, the modification of the activation values using different ones of the decomposition vectors can allow a user to create different effects in the image generated by the generative neural network, such as left-right and top-down camera translations that change the pose and location of a subject in the image, left-right and top-down camera rotations that change the camera position, zooming in and out, removal of artifacts, simplification of scenes, and so forth. The activation values can be modified based on a decomposition vector in various manners, such as by unrolling the activation values into an activation vector. A decomposition vector can be added to the activation value, can be subtracted from the activation vector, can be projected onto the activation vector, and so forth. The modified activation values are then converted to a form for input to the next layer (e.g., converted to a matrix form) and provided to the next layer of the generative neural network. All of the activation values input to the next layer can be replaced with the modified activation values, or only some of the activation values input to the next layer can be replaced with the modified activation values.

Additionally or alternatively, in situations in which a latent vector is input to multiple layers of the generative neural network, the decomposition vectors are used to modify the latent vector input to one or more layers of the generative neural network. Each decomposition vector corresponds to a different effect on the image being generated by the generative neural network as discussed above. The latent vector can be modified based on a decomposition vector in various manners, such as by adding a decomposition vector to the latent vector or subtracting a decomposition vector from the latent vector, then providing the modified latent vector to the next layer of the generative neural network.

Different layers of the generative neural network correspond to different amounts by which modification of the activation values or latent vector input have a global or local effect on the image. Modifications made at earlier layers have a more global effect on the image being generated whereas modifications made at later layers have a more local effect on the image. A global effect refers to the modification effecting a large amount of the image whereas a local effect refers to the modification effecting a smaller amount of the image. Accordingly, by selecting an appropriate layer the user can control how global or local the effect is on the image.

In one or more implementations, the activation values or latent vector input are modified after an initial image is generated by the generative neural network. This allows the user to view the initial image, provide input requesting one or more effects be performed, and have the generative neural network generate a new image with the requested effects. Additionally or alternatively, the activation values or latent vector input can be modified as part of generating an initial image by the generative neural network. For example, a user can provide input requesting one or more effects be performed, and the initial image generated by the generative neural network has the requested effects.

Additionally or alternatively, an intermediate latent space can be modified to change a style of the image generated by the generative neural network, such as changing a coloration of the image or a background of the image. The style of a generated image can be changed, for example, by applying an initial latent vector to a first one or more layers of the generative neural network but applying a different latent vector (e.g., generated randomly or pseudorandomly) to a second one or more later layers of the generative neural network. Thus, different latent vectors are applied to different layers of the generative neural network, allowing the user to control the style of the generated image.

Additionally or alternatively, an intermediate latent space can be modified to have the generative neural network generate an image that is a composite of two other images. Such a composite image is generated by having a generative neural network generate two images, also referred to as source images. This allows the user to control the output of the generative neural network to enable generation of high-quality composite or hybrid images. The activation values for the two source images from a particular layer of the generative neural network can be combined in various manners, such as by splicing (using different parts of) the activation values from the different source images, by blending (e.g., interpolating) activation values from the different source images, and so forth, to generate a composite or hybrid image based on the two source images.

The techniques discussed herein allow for a wide range of control over the images generated by a generative neural network that was not previously possible. By manipulating data in the intermediate latent space various different effects on the image being generated can be achieved. Additionally, the techniques discussed herein allow for easy control over the images being generated by a generative neural network. Simple and straightforward input (e.g., user requests) for different effects can be received. For example, an input request to zoom in or out (e.g., selection of a "zoom in" or "zoom out" button, selection of a "zoom out 3×" or "zoom in 2×" button) can indicate the requested effect rather than requiring access to an image that is zoomed in or out by the requested amount. This alleviates the need to have the user provide additional data or additional supervision in order to control the output of the generative neural network.

Furthermore, the techniques discussed herein allow a generative neural network to generate images quickly. An input indicating a requested effect can be received and immediately used by the generative neural network to generate an image with the requested effect. No additional training of the generative neural network in order to generate the desired effect need be performed. Additionally, the techniques discussed herein employ simple modifications of the generative neural network coefficients (the activation values) or the latent vectors input to the intermediate latent space. This alleviates the need to make significant modifications or changes to the generative neural network in order to achieve the effect requested by the user.

In addition, the techniques discussed herein recognize that generative neural networks model the notion of style in a generated image. By providing the proper modifications to the intermediate latent space (e.g., changing the latent vector input to the intermediate latent space), the techniques discussed herein allow the user to control the style of the image generated.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the controlling a neural network through intermediate latent spaces described herein. The illustrated environment 100 includes a computing device 102, which may be configured in a variety of ways. The computing device 102, for instance, may be configured as a mobile device (e.g., assuming a handheld configuration such as a tablet or mobile phone), a wearable device (e.g., augmented reality or virtual reality headsets, smartwatches), a laptop computer, a desktop computer, a game console, an automotive computer, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 20.

The computing device 102 is illustrated as including a generative neural network 104 trained to generate images and a generative neural network control system 106. The generative neural network 104 can be any of a variety of different types of neural networks, such as a generative adversarial network (GAN). It should be noted that a GAN typically contains a generator network and a discriminator network. Once the GAN is trained, the discriminator network is no longer needed. Accordingly, the generative neural network 104 can be, for example, the generator network of a GAN.

The generative neural network 104, under the control of the generative neural network control system 106, processes and transforms digital content 108, which is illustrated as maintained in storage 110 of the computing device 102. Such processing includes creation of the digital content 108 (including by manipulating the intermediate latent space as discussed herein) and rendering of the digital content 108 in a user interface, e.g., by a display device. The storage 110 can be any of a variety of different types of storage, such as random access memory (RAM), Flash memory, solid state drive, magnetic disk drive, and so forth. Although illustrated as implemented locally at the computing device 102, functionality of the generative neural network 104 or the generative neural network control system 106 may also be implemented in whole or part via functionality available via a network 112, such as part of a web service or "in the cloud."

The generative neural network 104 is made up of multiple layers with activation values being generated by one layer and passed to a successive layer. The generative neural network control system 106 imposes various controls on the image generated by the generative neural network 104 by modifying these activation values in various manners as discussed in more detail below. For example, the generative neural network 104 receives an initial latent vector 114, such as a random value. A class vector indicating a class of image to generate (e.g., dog, cat, man, woman, car, landscape, etc.) can be included as part of the latent vector 114 or can be provided separately to the generative neural network 104 (e.g., input to the initial layer and optionally additional layers of the generative neural network 104). By controlling the generative neural network 104, the generative neural network control system 106 allows the neural network 104 to generate different images from the latent vector 114. For example, the generative neural network control system 106 can manipulate the intermediate latent space of the generative neural network 104 to control the generative neural network 104 to generate an image of a dog that appears to have been captured from a direction looking straight into the dog's face, illustrated as image 116, or an image of a dog that appears to have been captured from a direction looking at the side of the dog's face, illustrated as image 118.

It should be noted that although the generative neural network control system 106 is illustrated as a standalone system in FIG. 1, the generative neural network control system 106 can be implemented as part of another program or system. For example, the generative neural network control system 106 can be implemented as part of a digital content editing or creation system, part of an operating system, and so forth.

Although illustrated as a neural network, the generative neural network 104 can be a generative machine learning system implemented using various different machine learning techniques. The discussions herein regarding a generative neural network refer analogously to other generative machine learning systems. Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Neural Network Control System Architecture

Figure 2:
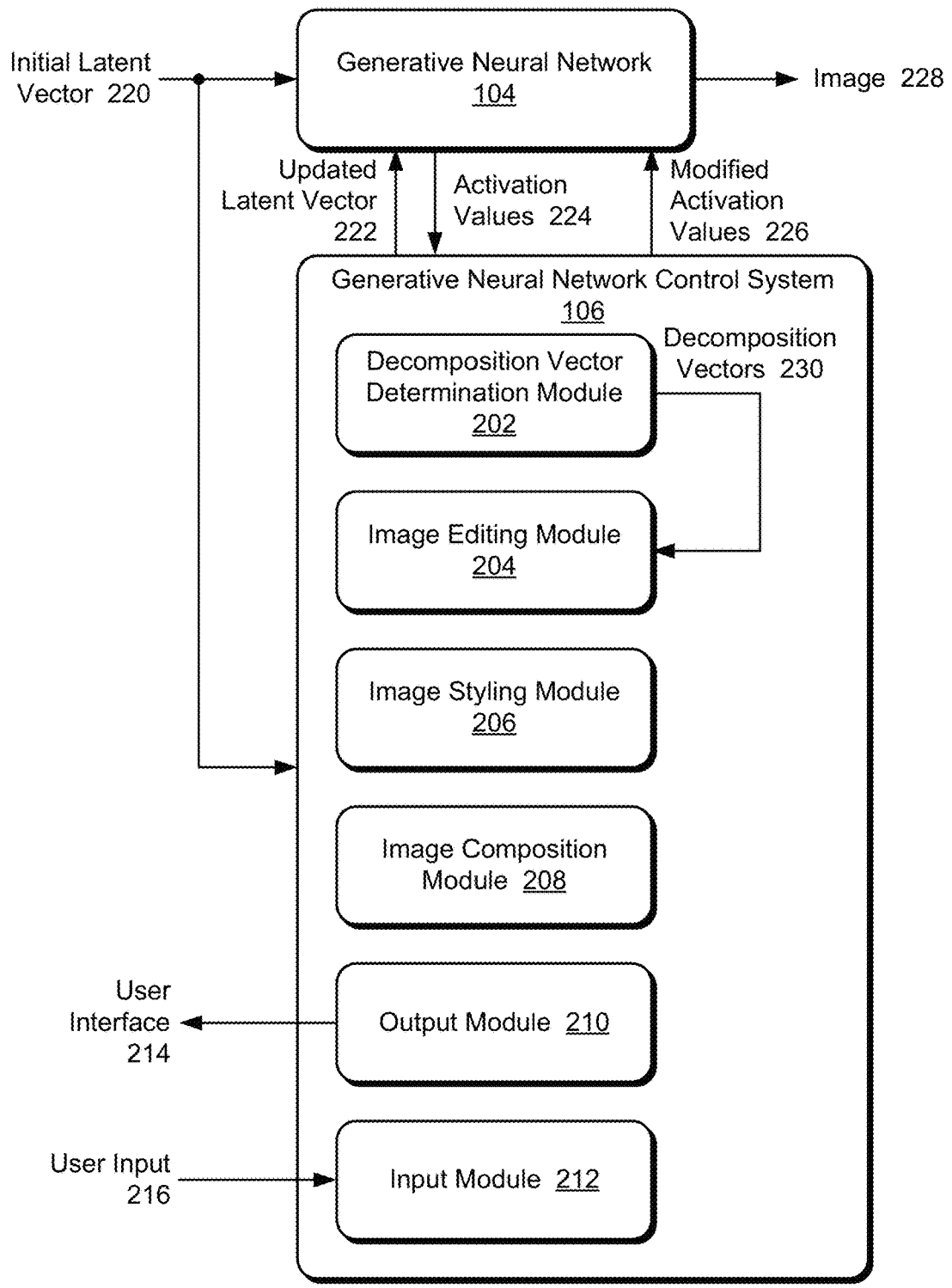
FIG. 2 is an illustration of an example architecture of a generative neural network control system.

FIG. 2 is an illustration of an example architecture of a generative neural network control system 106. The resource management system 106 includes a decomposition vector determination module 202, an image editing module 204, an image styling module 206, an image composition module 208, an output module 210, and an input module 212.

The generative neural network 104 is a neural network that has already been trained to generate images. Additionally or alternatively, additional training or fine-tuning of the generative neural network 104 can optionally be performed concurrent with or subsequent to using the techniques discussed herein.

The decomposition vector determination module 202 implements functionality to generate one or more decomposition vectors for a set of activation values (also referred to as simply a set of activations) generated by a layer of the generative neural network 104. The image editing module 204 implements functionality to perform translations or transformations of the image generated by the generative neural network 104, such as to zoom in or zoom out, translate left or right, and so forth. Additionally or alternatively, the image editing module 204 also implements functionality to clean up the image generated by the generative neural network 104 by removing artifacts, or simplify the image generated by the generative neural network 104 by removing details.

The image styling module 206 implements functionality to change a style of the image generated by the generative neural network 104, such as change a coloration of the image or a background of the image. The image composition module 208 implements functionality to have the generative neural network 104 generate an image that is a composite of two other images. The output module 210 generates a user interface 214 for display indicating the types of control functionality that the generative neural network control system 106 can exert on the generative neural network 104. The input module 212 implements functionality to receive user inputs 216 indicating what control functionality the user desires to have the generative neural network control system 106 exert on the generative neural network 104.

In order to control the generative neural network 104, the generative neural network control system 106 provides to, and optionally receives from, the generative neural network 104 various information. In one or more implementations, the generative neural network 104 receives an initial latent vector 220 from which the generative neural network 104 will generate an image. The generative neural network control system 106 also optionally receives the initial latent vector 220. The initial latent vector 220 can be generated in any of a variety of different manners, such as randomly or pseudorandomly. The initial latent vector 220 can also include, or be accompanied by, a class vector that identifies a class of object that the generative neural network 104 is to generate (e.g., dog, cat, man, woman, car, landscape, etc.). This class of object can be identified in various manners, such as from user input selecting a class, a configuration setting for the generative neural network 104, and so forth.

In one or more implementations, the generative neural network control system 106 obtains and provides to the generative neural network 104 an updated latent vector 222 (also referred to as a changed latent vector). This updated latent vector 222 is used in certain layers of the generative neural network 104 in place of the initial latent vector 220 as discussed in more detail below. In one or more implementations, a set of activation values 224 generated by one layer of the generative neural network 104 is provided to the generative neural network control system 106. This set of activation values is modified by the generative neural network control system 106 and the modified activation values 226 are provided to the generative neural network control system 106. The modified activation values 226 are used in generating the image 228 as discussed in more detail below.

Although illustrated as including all of modules 202-212, in various alternatives one or more of the modules 202-212 need not be included in the generative neural network control system 106. For example, if the generative neural network control system 106 were not to include functionality to have the generative neural network 104 generate an image that is a composite of two other images, then the image composition module 208 need not be included in the generative neural network control system 106.

Decomposition

Figure 3:
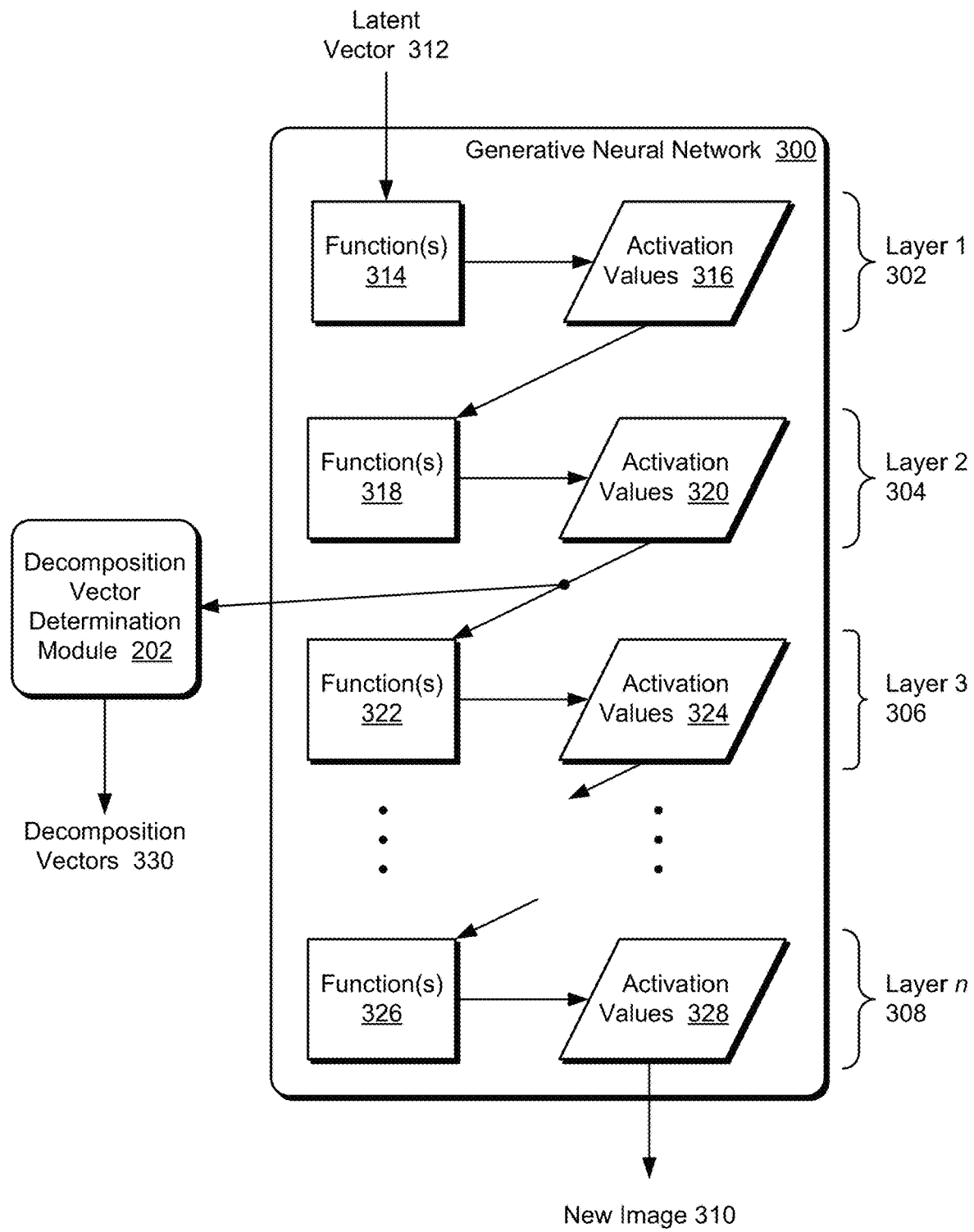
FIG. 3 illustrates an example generative neural network.

FIG. 3 illustrates an example generative neural network 300. The generative neural network 300 can be, for example, a generative neural network 104 of FIG. 1 or FIG. 2. The generative neural network 300 includes multiple (n) layers, illustrated as layers 302, 304, 306, and 308. Generally, each layer performs one or more operations or functions on received data, and generates output data referred to as activation values or simply activations. The operations or functions performed at any given layer vary based on the architecture of the generative neural network 300. The example generative neural network 300 is a feedforward neural network that receives the latent vector 312 as input to an initial layer of the generative neural network 300 (layer 302 in the illustrated example) but is not input directly to other layers of the generative neural network 300.

For example, the generative neural network 300 can be implemented as one or more convolutional neural networks (CNNs). A CNN is formed from layers of nodes (i.e., neurons) and can include various layers that perform various operations or functions such as input functions, output functions, convolutional functions, pooling functions, activation functions, fully connected functions, normalization functions, and so forth.

The data that is input to each layer (other than layer 1) is referred to as data in an intermediate latent space. In contrast, the latent vector 312 input to layer 1 of the generative neural network 300 is referred to as data in the latent space of the generative neural network or data in an initial latent space. The data in the intermediate latent space includes activation values (e.g., generated by one or both of the previous layer or using the techniques discussed herein) and optionally a latent vector as discussed in more detail below. The techniques discussed herein modify the intermediate latent space to achieve various different effects when generating a new image.

To generate a new image 310, a latent vector 312 is input to the initial layer of the generative neural network 300, illustrated as layer 302. In layer 302 one or more functions 314 are performed on the latent vector 312, which generates various activation values 316. The activation values 316 are provided as an input to layer 304. In layer 304 one or more functions 318 are performed on the activation values 316, which generates various activation values 320. The activation values 320 are provided as an input to layer 306. In layer 306 one or more functions 322 are performed on the activation values 320, which generates various activation values 324. The activation values 324 are provided as an input to the next layer. Eventually, the activations from the penultimate layer are provided to the layer 308. In layer 308 one or more functions 326 are performed on the activation values received from the previous layer, which generates various activation values 328. The activation values 328 are output as the generated new image 310.

The decomposition vector determination module 202 generates one or more decomposition vectors 330 based on the activation values generated by one or more layers of the generative neural network 300. To generate the one or more decomposition vectors 330, a particular number of different latent vectors 312 are provided to the generative neural network 300 and activation values 320 generated for those latent vectors 312 are received and maintained by the decomposition vector determination module 202. This particular number of latent vectors 312 can vary, but is typically on the order of 10,000 to 100,000 latent vectors in order to provide a significant number of examples from which the decomposition can be performed.

In the illustrated example of FIG. 3, the activation values 320 are provided to the decomposition vector determination module 202 as well as provided to (or in place of being provided to) the one or more functions 322. The decomposition vector determination module 202 is thus able to generate one or more decomposition vectors 330 based on the activation values generated in layer 304 (also referred to as generating one or more decomposition vectors 330 for the layer 304).

The decomposition performed by the decomposition vector determination module 202 refers to analyzing the set of activation values received from a layer of the generative neural network 300 to identify one or more vectors representing the set of activation values. The activation values received from a layer for a particular latent vector 312 are unrolled (converted) into an activation vector. This results in a large number (e.g., 10,000 to 100,000) of activation vectors each of which can have a high dimension (e.g., hundreds or thousands of elements). Any of a variety of different public or proprietary techniques can be used to analyze this set of activation vectors in order to generate the decomposition vectors 300. For example, each activation vector in this set of activation vectors represents a point in a multi-dimensional space (however many dimensions each vector has). These points create a point cloud in the multi-dimensional state and various techniques can be used to determine which directions that point cloud is most extended (the directions for which the point cloud has the most variance). Vectors indicating these directions of most extension (variance) are the decomposition vectors 330.

In one or more implementations, the decomposition vector determination module 202 is implemented using Principal Component Analysis (PCA) to characterize the shape of the point cloud. The decomposition vector determination module 202 generates a set of eigenvectors from the point cloud, each eigenvector being one of the decomposition vectors 330. The decomposition vector determination module 202 also generates and stores a set of eigenvalues for the point cloud.

Additionally or alternatively, other decomposition techniques can be used to generate the decomposition vectors 330, including other eigendecomposition techniques that generate eigenvectors. By way of example, the decomposition vector determination module 202 can be implemented using Sparse PCA, independent component analysis (ICA), non-negative matrix factorization (NNMF), and so forth.

Although the example of FIG. 3 illustrates generating one or more decomposition vectors 330 for the layer 304, additionally or alternatively the decomposition vector determination module 202 can generate decomposition vectors 330 for any other layers of the generative neural network 300. The decomposition vector determination module 202 typically generates one or more decomposition vectors for the second layer in the generative neural network 300 (layer 304) or later layer (e.g., layers 306-308), although in some situations can also generate one or more decomposition vectors for the first layer (layer 302). The decomposition vector determination module 202 can generate one or more decomposition vectors for a layer other than the layer 304 in an analogous manner as discussed above with respect to generating decomposition vectors 330 for the layer 304, except that the decomposition vectors 330 are generated from the activation values output by that layer. E.g., one or more decomposition vectors are generated for the layer 306 using the activation values 324.

It should be noted that the one or more decomposition vectors 330 can be generated for each of multiple different layers concurrently or consecutively. For example, a set of multiple latent vectors 312 can be provided to the generative neural network 300 and for each latent vector 312 the decomposition vector determination module 202 receives and maintains the activation values 320 for layer 304 and the activation values 324 for layer 306. After activation values 320 and 324 for all latent vectors in the set of multiple latent vectors 312 have been received, the decomposition vector determination module 202 generates a set of decomposition vectors 330 for the layer 304 and a set of decomposition vectors for the layer 306, thus concurrently generating the decomposition vectors for multiple different layers.

By way of another example, a first set of multiple latent vectors 312 can be provided to the generative neural network 300 and for each latent vector in the first set the decomposition vector determination module 202 receives and maintains the activation values 320 for layer 304. A second set of multiple latent vectors 312 can be provided to the generative neural network 300 (the same or different latent vectors than the first set) and for each latent vector in the second set the decomposition vector determination module 202 receives and maintains the activation values 324 for layer 306. The decomposition vector determination module 202 then generates a set of decomposition vectors 330 for the layer 304 and a set of decomposition vectors for the layer 306, thus consecutively generating the decomposition vectors for multiple different layers. The decomposition vector determination module 202 can generate the set of decomposition vectors for the layer 304 after activation values 320 and 324 for all latent vectors in the first and second set of multiple latent vectors 312 have been received, or after the activation values for all the latent vectors in the first set of multiple latent vectors have been received but prior to receiving the activation values for all the latent vectors in the second set of multiple latent vectors.

It should be noted that when generating the decomposition vectors 330, the generative neural network 300 can, but need not, generate a new image 310 for each of the multiple latent vectors 312. Rather, the generative neural network 300 can cease performing functions and generating activation values for a latent vector 312 after the activation values for the last layer for which decomposition vectors are being generated have been provided to the decomposition vector determination module 202. For example, if the decomposition vector determination module 202 is generating decomposition vectors 330 for only the layer 304, after the activation values 320 are provided to the decomposition vector determination module 202 the generative neural network 300 can cease operating on the generated activation values, so the functions 322 need not use the activation values 320 to generate the activation values 324.

Figure 4:
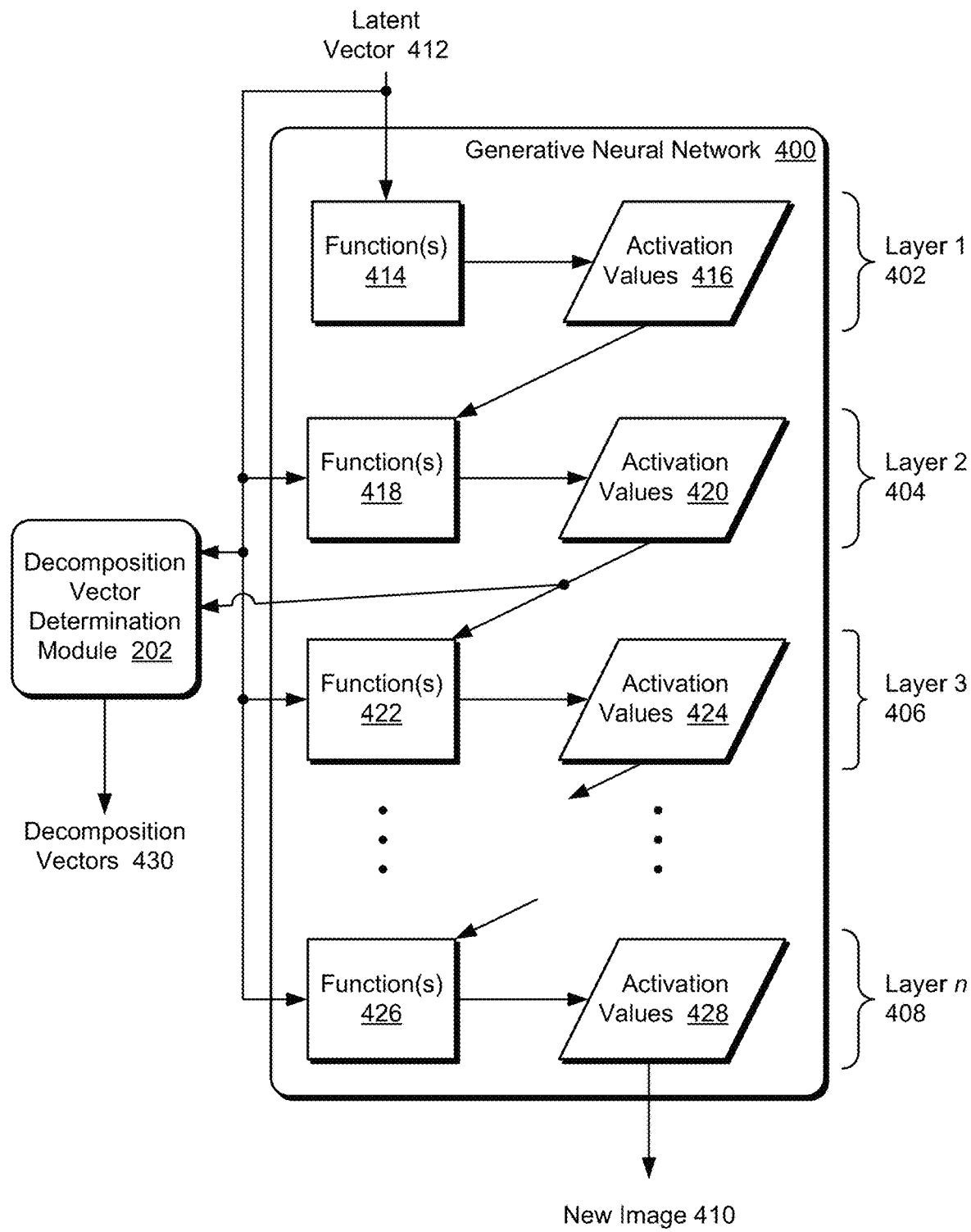
FIG. 4 illustrates another example generative neural network.

FIG. 4 illustrates another example generative neural network 400. The generative neural network 400 can be, for example, a generative neural network 104 of FIG. 1 or FIG. 2. The generative neural network 400 includes multiple (n) layers, illustrated as layers 402, 404, 406, and 408, and generates a new image 410. Generally, each layer performs one or more operations or functions on received data, and generates output data referred to as activation values or simply activations, analogous to the layers of the generative neural network 300 of FIG. 3. However, the example generative neural network 400 differs from the generative neural network 300 of FIG. 3 in that a latent vector 412 is input to multiple layers (e.g., each layer) of the generative neural network 400.

To generate a new image 410, a latent vector 412 is input to the initial layer of the generative neural network 400, illustrated as layer 402. In layer 402 one or more functions 414 are performed on the latent vector 412, which generates various activation values 416. The activation values 416 as well as the latent vector 412 are provided as inputs to layer 404. In layer 404 one or more functions 418 are performed on the activation values 416 and the latent vector 412, which generates various activation values 420. The activation values 420 as well as the latent vector 412 are provided as inputs to layer 406. In layer 406 one or more functions 422 are performed on the activation values 420 and latent vector 412, which generates various activation values 424. The activation values 424 as well as the latent vector 412 are provided as inputs to the next layer. Eventually, the activations from the penultimate layer as well as the latent vector 412 are provided as inputs to the layer 408. In layer 408 one or more functions 426 are performed on the activation values received from the previous layer and the latent vector 412, which generates various activation values 428. The activation values 428 are output as the generated new image 410. Thus, the generative neural network 400 operates analogous to the generative neural network 300 of FIG. 3, except that the one or more functions performed at one or more layers of the generative neural network 400 are performed on activation values received from the previous layer as well as the latent vector 412.

The decomposition vector determination module 202 generates one or more decomposition vectors 430 based on the activation values generated by one or more layers of the generative neural network 400 in a manner similar to the manner discussed above with respect to generative neural network 300 of FIG. 3. However, in the example of FIG. 4 the decomposition vector determination module 202 unrolls (coverts) the activation values received from a layer for a particular latent vector 412 into an activation vector and appends that particular latent vector 412 to the activation vector (e.g., concatenates the activation vector and the latent vector). The decomposition vector determination module 202 then proceeds as discussed above with reference to FIG. 3, although the dimension space is larger as a result of appending the latent vector 412 to the activation vector generated from the activation values.

Additionally or alternatively, the decomposition vector determination module 202 can generate the one or more decomposition vectors based on the activation values generated by one or more layers of the generative neural network 400 analogous to the discussion above with respect to the generative neural network 300 of FIG. 3. In such situations, the decomposition vector determination module 202 ignores (does not factor into generating the one or more decomposition vectors) the latent vector 412.

Returning to FIG. 2, the decomposition vector determination module 202 obtains the decomposition vectors for one or more layers of the generative neural network 104. The decomposition vector determination module 202 can obtain the decomposition vectors as discussed above with reference to FIG. 3. Additionally or alternatively, the decomposition vectors can have been previously determined and are retrieved by the decomposition vector determination module 202 (e.g., from storage at the computing device implementing the generative neural network control system 106, from a remote device or service, and so forth).

For example, one or more decomposition vectors can be generated for each of multiple layers (e.g., all layers) of the generative neural network 104 and stored. These decomposition vectors can be generated by the generative neural network control system 106 or by another device or system (e.g., accessed via the network 112).

As discussed above, numerous (e.g., 10,000 to 100,000) are input latent vectors 312 of FIG. 3 or latent vectors 412 of FIG. 4 are used to generate the decomposition vectors. In one or more implementations, for the latent vectors input to the generative neural network to generate the decomposition vectors the class vector is fixed (e.g., is the same for all the latent vectors 312 or 412). Additionally or alternatively, different class vectors can be used.

Image Editing, Cleanup, and Simplifying

In one or more implementations, the image editing module 204 implements functionality to perform translations or transformations of the image generated by the generative neural network 104, such as to zoom in or zoom out, translate left or right, and so forth. The image editing module 204 performs translations or transformations by using one or more decomposition vectors 230 to modify one or both of the activation values from one or more layers and the latent vector input to one or more layers. Additionally or alternatively, the image editing module 204 implements functionality to cleanup artifacts or simplify images generated by the generative neural network 104 as discussed in more detail below.

Each decomposition vector 230 corresponds to a different effect (translation or transformation) on the image 228 being generated by the generative neural network 104. A decomposition vector 230 can correspond to a variety of different effects. For example, a decomposition vector 230 can correspond to translation (moving an object in the image, such as a dog, person, car, etc.) left to right or right to left, top to bottom or bottom to top, combinations thereof, and so forth. By way of another example, a decomposition vector 230 can correspond to camera motion (changing the view of an object in the image to give an effect of moving a camera capturing the image in a particular direction) left to right or right to left, top to bottom or bottom to top, combinations thereof, and so forth. By way of another example, a decomposition vector 230 can correspond to zooming in or zooming out on an object in the image.

By way of another example, a decomposition vector 230 can correspond to rotation of a camera (changing the view of an object in the image to give an effect of moving a camera capturing the image around the object) left to right or right to left, top to bottom or bottom to top, combinations thereof, and so forth. By way of another example, a decomposition vector 230 can correspond to changing a dimension (e.g., height or width) of an object in the image, such as making the object taller or shorter, wider or narrower, combinations thereof, and so forth.

FIG. 5 illustrates an example 500 of a translation effect. The example 500 illustrates translation of an object in the image, a dog, from left to right. As illustrated at 502, the dog is at the left part of the image. At 504, the dog has been translated some to the right, and at 506 the dog has been translated to the right and is in approximately the center of the image. At 508 the dog has been translated to the right part of the image.

FIG. 6 illustrates an example 600 of a camera motion effect. The example 600 illustrates camera motion from top right to bottom left. As illustrated at 602, the view of the dog in the image appears to be taken from a camera situated above and to the right of the dog. At 604, the view of the dog in the image appears to be taken from a camera situated lower and to the left of the camera at 602, and at 606 the view of the dog in the image appears to be taken from a camera situated even lower and further to the left of the camera at 604. At 608, the view of the dog in the image appears to be taken from a camera situated further lower and to the left of the camera at 606.

Figure 7:
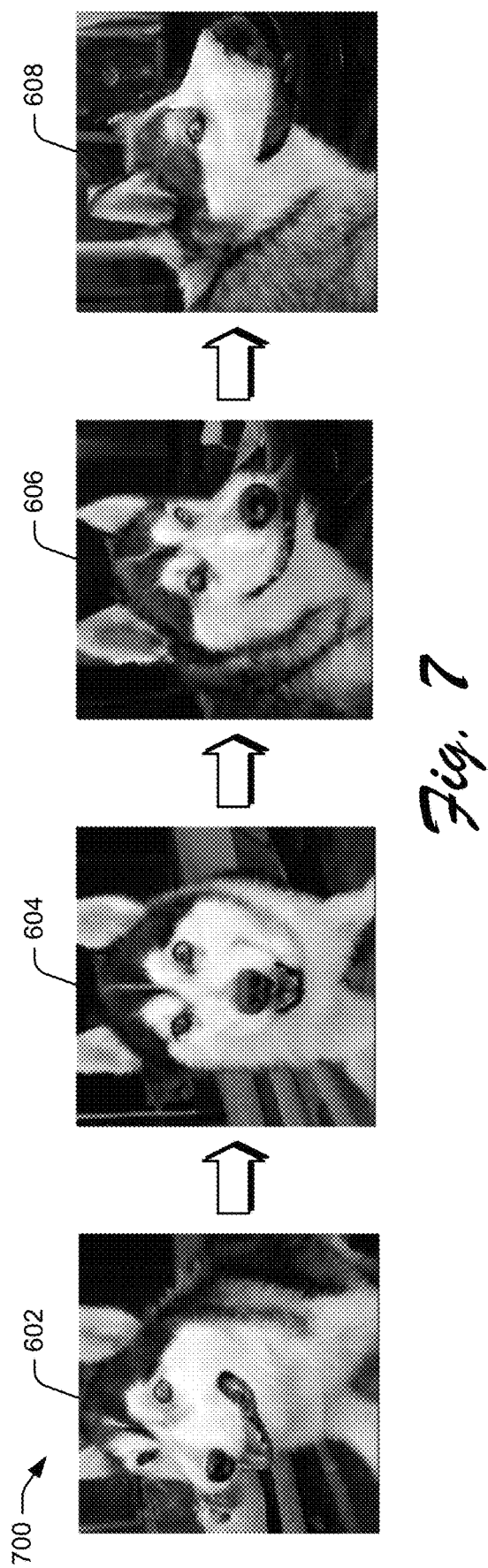
FIG. 7 illustrates an example of a rotation of a camera effect.

FIG. 7 illustrates an example 700 of a rotation of a camera effect. The example 700 illustrates rotation of a camera right to left. As illustrated at 702, the view of the dog in the image appears to be taken from a camera situated to the right (from the point of view of the camera) of the dog. At 704, the view of the dog in the image appears to be taken from a camera rotated around the dog to the left of the camera at 702, and at 706 the view of the dog in the image appears to be taken from a camera rotated around the doge even further to the left of the camera at 704. At 708, the view of the dog in the image appears to be taken from a camera situated to the left (from the point of view of the camera) of the dog.

Returning to FIG. 2, which decomposition vector 230 corresponds to which effect for a particular generative neural network 104 can be determined in various manners, such as empirically. However, the effect corresponding to a particular decomposition vector 230 for a particular generative neural network 104 remains the same for different class vectors. Accordingly, a user interface can be displayed or otherwise presented to a user (e.g., as part of a digital content creation application) allowing the user to generate images using the generative neural network 104 and select a particular effect (e.g., zoom in or zoom out), and the digital content creation application uses the appropriate decomposition vector 230 to perform the selected effect.

Additionally, different layers of the generative neural network 104 correspond to different amounts by which modification of the activation values or latent vector input have a global or local effect on the image 228. Modifications made at earlier layers (e.g., layer 2 of FIG. 3) have more of a global effect on the image 228 whereas modifications made at later layers (e.g., a fifth or sixth layer) have more of a local effect on the image 228. A global effect refers to the modification effecting a large amount of the image whereas a local effect refers to the modification effecting a smaller amount of the image.

The result of modifying the activation values or latent vector input at different layers for different effects and different generative neural networks can be determined in various manners, such as empirically. However, the result of modifying the activation values or latent vector input at a particular layer for a particular generative neural network 104 remains the same for different class vectors. Accordingly, a user interface can be displayed or otherwise presented to a user (e.g., as part of a digital content creation application) allowing the user to generate images using the generative neural network 104 and select a particular result (e.g., more global or more local), and the digital content creation application uses the appropriate decomposition vector 230 to obtain the selected result.

In one or more implementations, the activation values or latent vector input are modified after an initial image 228 is generated by the generative neural network 104. This allows the user to view the initial image 228, request one or more effects be performed, and have the generative neural network 104 generate a new image 228 with the requested effects. Additionally or alternatively, the activation values or latent vector input can be modified as part of generating an initial image 228 by the generative neural network 104. For example, a user can request one or more effects be performed, and the initial image 228 generated by the generative neural network 104 has the requested effects.

Figure 8:
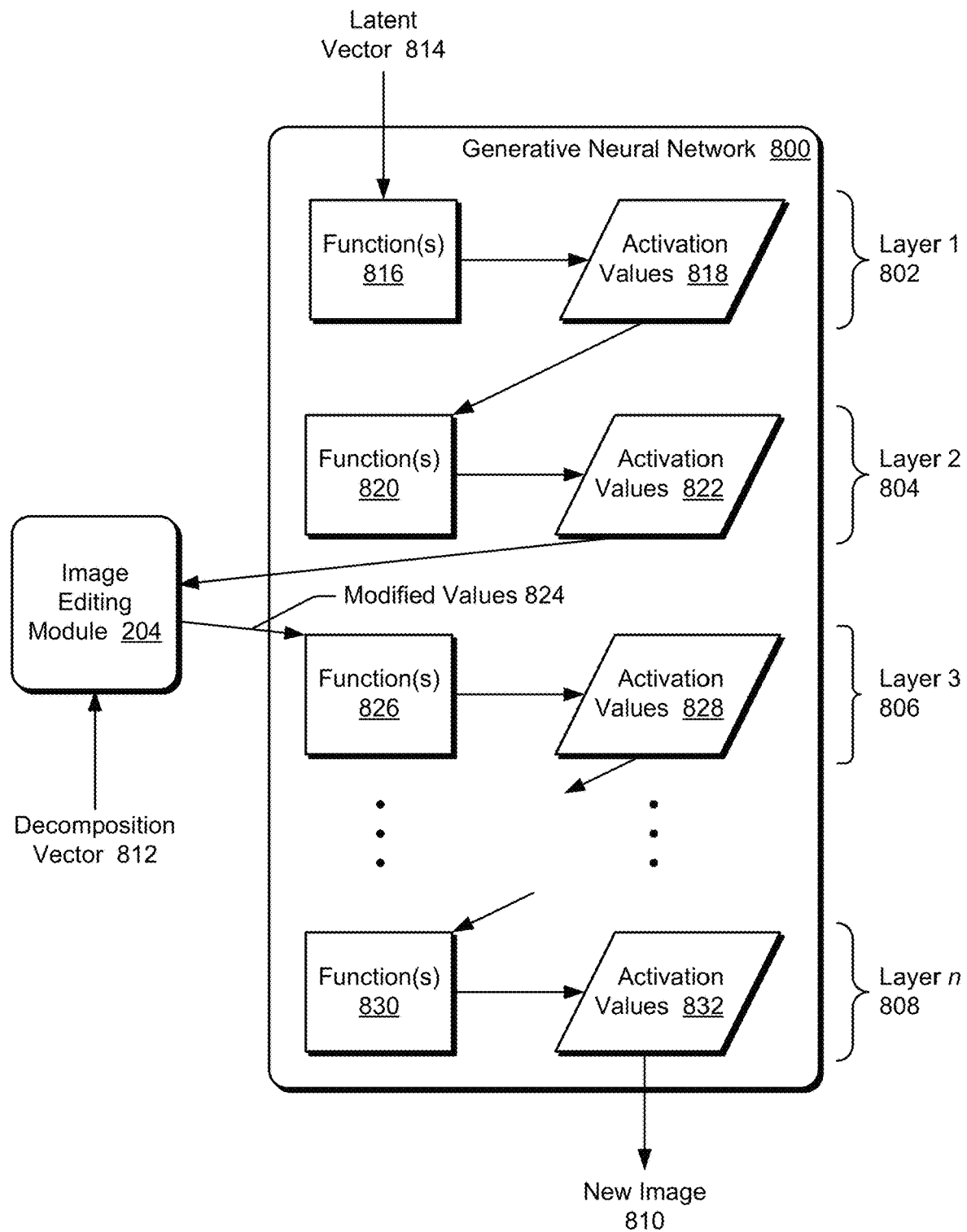
FIG. 8 illustrates an example of modifying the activation values for a layer of a generative neural network.

In one or more implementations, the image editing module 204 performs translations or transformations by using one or more decomposition vectors 230 to modify the activation values from one or more layers of the generative neural network 104. FIG. 8 illustrates an example of modifying the activation values for a layer of a generative neural network 800. The generative neural network 800 can be, for example, a generative neural network 104 of FIG. 1 or FIG. 2. The generative neural network 800 includes multiple (n) layers, illustrated as layers 802, 804, 806, and 808, and generates a new image 810. Generally, each layer performs one or more operations or functions on received data, and generates output data referred to as activation values or simply activations, analogous to the layers of the generative neural network 300 of FIG. 3. In the example of FIG. 8, the image editing module 204 modifies activation values generated at layer 804 based on a decomposition vector 812 obtained by the decomposition vector determination module 202. This modifying of the activation values generated at layer 804 is modifying the intermediate latent space between layers 804 and 806.

To generate a new image 810, a latent vector 814 is input to the first layer 802. In layer 802 one or more functions 816 are performed on the latent vector 814, which generates various activation values 818. The activation values 818 are provided as input to layer 804. In layer 804 one or more functions 820 are performed on the activation values 818, which generates various activation values 822. The activation values 822 are provided as input to the image editing module 204. The image editing module 204 uses the decomposition vector 812 to modify the activation values 822, and provides the modified activation values 824 as input to the layer 806.

In layer 806 one or more functions 826 are performed on the modified activation values 824, and the one or more functions 826 generate various activation values 828. The activation values 828 are provided as inputs to the next layer. Eventually, the activations from the penultimate layer are provided as inputs to the layer 808. In layer 808 one or more functions 830 are performed on the activation values received from the previous layer, which generates various activation values 832. The activation values 832 are output as the generated new image 810.

The image editing module 204 modifies the activation values 822 based on the decomposition vector 812. In one or more implementations, the image editing module 204 unrolls the activation values 822 into an activation vector, and adds the decomposition vector 812 to or subtracts the decomposition vector 812 from the activation vector, resulting in a modified activation vector. The image editing module 204 converts the modified activation vector to the same format as the activation values 822 (e.g., a matrix) to generate the modified activation values 824.

A value that is added to or subtracted from the activation vector is determined based on the magnitude of the decomposition vector 812. By controlling the value being added to or subtracted from the activation vector, how far the corresponding activation vector is moved in the direction corresponding to the decomposition vector 812 is controlled. For example, user input can be received indicating how much or a strength of the desired effect. Smaller amounts correspond to smaller values, and larger amounts correspond to larger values. E.g., if user input requests a small amount of the desired effect then the image editing module 204 adds a fraction (e.g., ¼) of the magnitude of the decomposition vector 812 to the corresponding activation vector. However, if the user input requests a large amount of the desired effect then the image editing module 204 adds a multiple (e.g., 2.0) of the magnitude of the decomposition vector 812 to the corresponding activation vector.

Modification of the activation values 822 based on adding the decomposition vector 810 to the corresponding activation vector results in translation or transformation in one direction (e.g., translation to the right, translation up, zoom in, etc.). On the other hand, modification of the activation values 822 based on subtracting the decomposition vector 812 from the corresponding activation vector elements results in translation or transformation in the opposite direction (e.g., translation to the left, translation down, zoom out, etc.).

In one or more implementations, in situations in which an initial image 228 has already been generated, the latent vector 814 need not be re-input to the generative neural network 812 in order to perform the desired effect. Rather, the activation values from the layers 802-808 can have been stored and are accessible to the image editing module 204. Accordingly, the image editing module 204 can retrieve the activation values 822 as previously generated, modify the activation values 822, and provide the modified activation values to the layer 806. Thus, new activation values 826 and 830 will be generated for the new image 810, but the previously generated activation values 818 and 822 need not be re-generated, improving the performance of the generative neural network 800 and the generative neural network control system 106.

Figure 9:
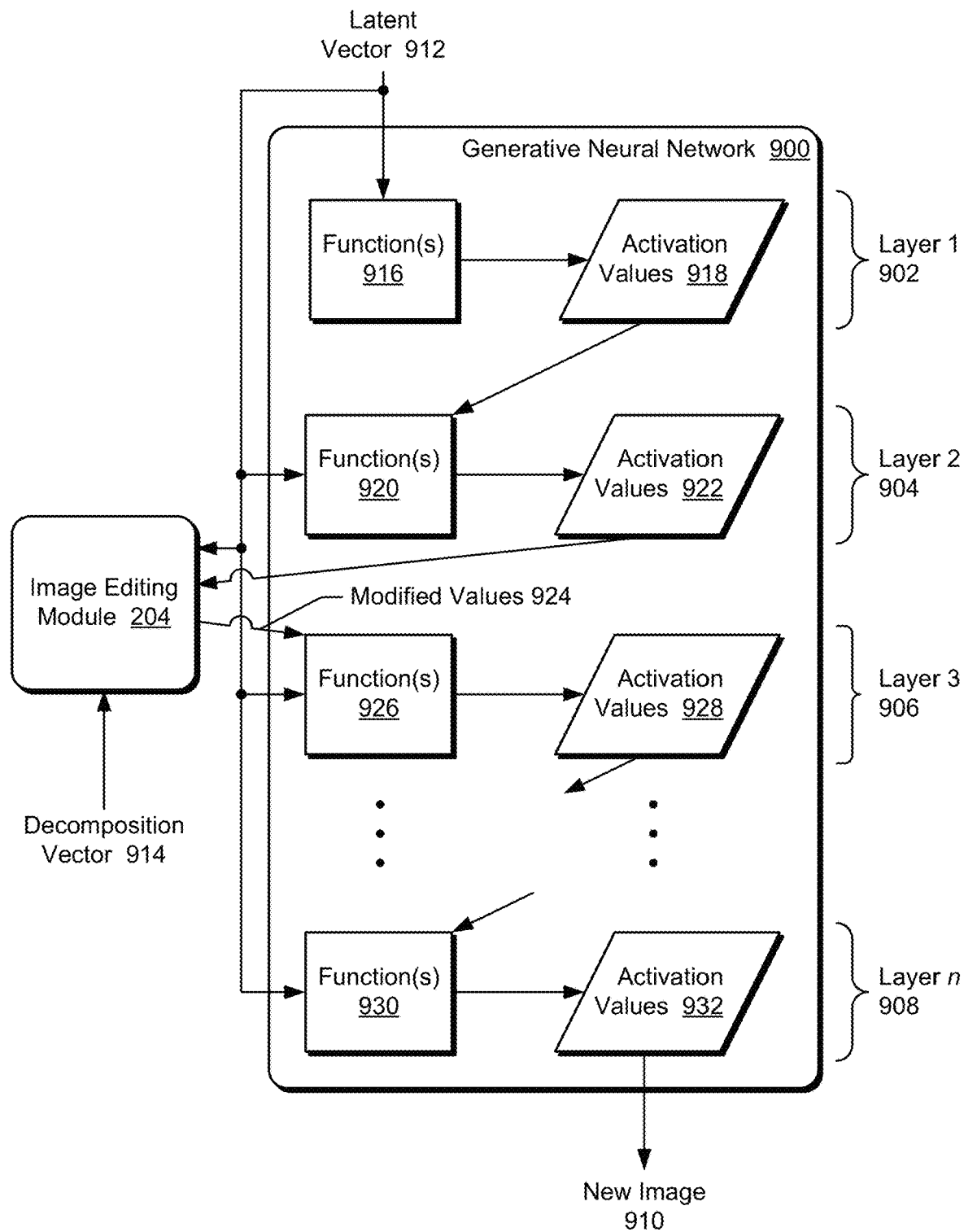
FIG. 9 illustrates another example generative neural network.

FIG. 9 illustrates another example generative neural network 900. The generative neural network 900 can be, for example, a generative neural network 104 of FIG. 1 or FIG. 2. The generative neural network 900 includes multiple (n) layers, illustrated as layers 902, 904, 906, and 908, and generates a new image 910. Generally, each layer performs one or more operations or functions on received data, and generates output data referred to as activation values or simply activations, analogous to the layers of the generative neural network 800 of FIG. 8. However, the example generative neural network 900 differs from the generative neural network 800 of FIG. 8 in that a latent vector 912 is input to multiple layers (e.g., each layer) of the generative neural network 900.

In the example of FIG. 9, the image editing module 204 modifies activation values generated at layer 904 based on a decomposition vector 914 obtained by the decomposition vector determination module 202. To generate a new image 910, the latent vector 912 is input to the initial layer 902. In layer 902 one or more functions 916 are performed on the latent vector 912, which generates various activation values 918. The activation values 918 as well as the latent vector 912 are provided as inputs to layer 904. In layer 904 one or more functions 920 are performed on the activation values 918 and the latent vector 912, which generates various activation values 922. The activation values 922 are provided as input to the image editing module 204. The image editing module 204 uses the decomposition vector 914 to modify the activation values 922, and provides the modified activation values 924 as input to the layer 906.

In layer 906 one or more functions 926 are performed on the modified activation values 924 and latent vector 912, and the one or more functions 926 generate various activation values 928. The activation values 928 as well as the latent vector 912 are provided as inputs to the next layer. Eventually, the activations from the penultimate layer as well as the latent vector 912 are provided as inputs to the layer 908. In layer 908 one or more functions 930 are performed on the activation values received from the previous layer and the latent vector 912, which generates various activation values 932. The activation values 930 are output as the generated new image 910.

The image editing module 204 can modify the activation values 922 based on the decomposition vector 914 in various manners similar to the discussion above regarding the example of FIG. 8. However, as the decomposition vector 914 is generated based on a concatenated activation vector and latent vector, the image editing module 204 adds to the activation vector (or subtracts from the activation vector) the portion of the decomposition vector 914 corresponding to the activation vector. Thus, in the example of FIG. 9, although the image editing module 204 modifies the activation values received from a layer, the same latent vector 912 is input to multiple different layers.

Figure 10:
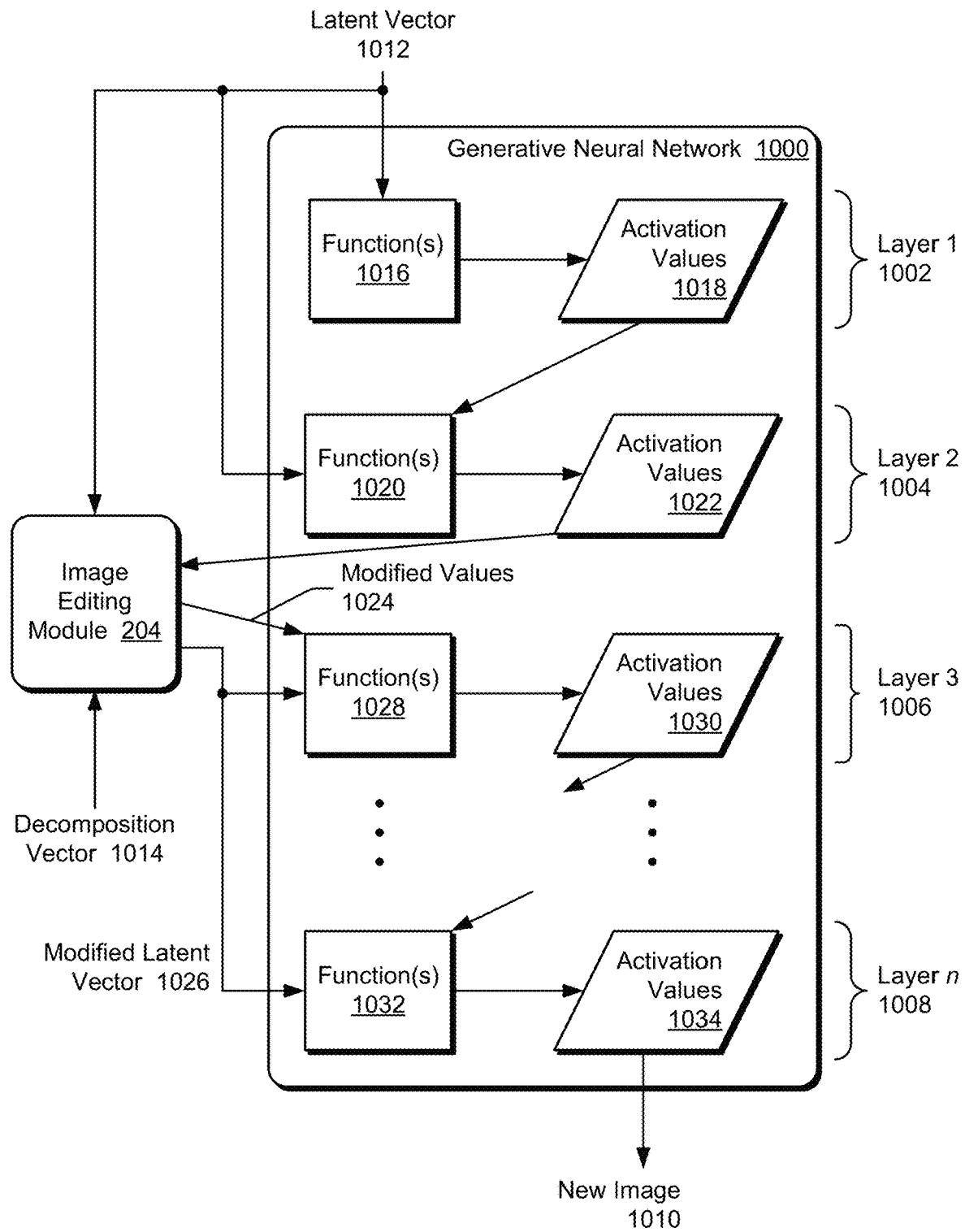
FIG. 10 illustrates another example generative neural network.

FIG. 10 illustrates another example generative neural network 1000. The generative neural network 1000 can be, for example, a generative neural network 104 of FIG. 1 or FIG. 2. The generative neural network 1000 includes multiple (n) layers, illustrated as layers 1002, 1004, 1006, and 1008, and generates a new image 1010. Generally, each layer performs one or more operations or functions on received data, and generates output data referred to as activation values or simply activations, analogous to the layers of the generative neural network 900 of FIG. 9. However, the example generative neural network 1000 differs from the generative neural network 900 of FIG. 9 in that a latent vector 1012 is input to some layers of the generative neural network 1000, but is modified by the image editing module 204 based on a decomposition vector 1014, and a modified latent vector is input to other layers.

To generate a new image 1010, the latent vector 1012 is input to the initial layer 1002. In layer 1002 one or more functions 1016 are performed on the latent vector 1012, which generates various activation values 1018. The activation values 1018 as well as the latent vector 1012 are provided as inputs to layer 1004. In layer 1004 one or more functions 1020 are performed on the activation values 1018 and the latent vector 1012, which generates various activation values 1022. The activation values 1022 are provided as input to the image editing module 204.

The image editing module 204 uses the decomposition vector 1014 to modify the activation values 1022, and provides the modified activation values 1024 as input to the layer 1006. Additionally, the image editing module 204 uses the decomposition vector 1014 to modify the latent vector 1012, and provides the modified latent vector 1026 as input to all layers after layer 1004 (e.g., layers 1006 and 1008).

In layer 1006 one or more functions 1028 are performed on the modified activation values 1024 and the modified latent vector 1026, and the one or more functions 1028 generate various activation values 1030. The activation values 1030 as well as the modified latent vector 1026 are provided as inputs to the next layer. Eventually, the activations from the penultimate layer as well as the modified latent vector 1026 are provided as inputs to the layer 1008. In layer 1008 one or more functions 1032 are performed on the activation values received from the previous layer and the modified latent vector 1026, which generates various activation values 1034. The activation values 1034 are output as the generated new image 1010.

The image editing module 204 can modify the activation values 1022 and the latent vector 1012 based on the decomposition vector 1014 in various manners similar to the discussion above regarding the example of FIG. 8. However, as the decomposition vector 1014 is generated based on a concatenated activation vector and latent vector, the image editing module 204 adds to the activation vector (or subtracts from the activation vector) the portion of the decomposition vector 1014 corresponding to the activation vector, and adds to the latent vector (or subtracts from the latent vector) the portion of the decomposition vector 1014 corresponding to the latent vector. Thus, in the example of FIG. 10, the image editing module 204 modifies both the activation values received from a layer and the latent vector 1012, and inputs the modified latent vector into subsequent layers of the generative neural network 1000.

Figure 11:
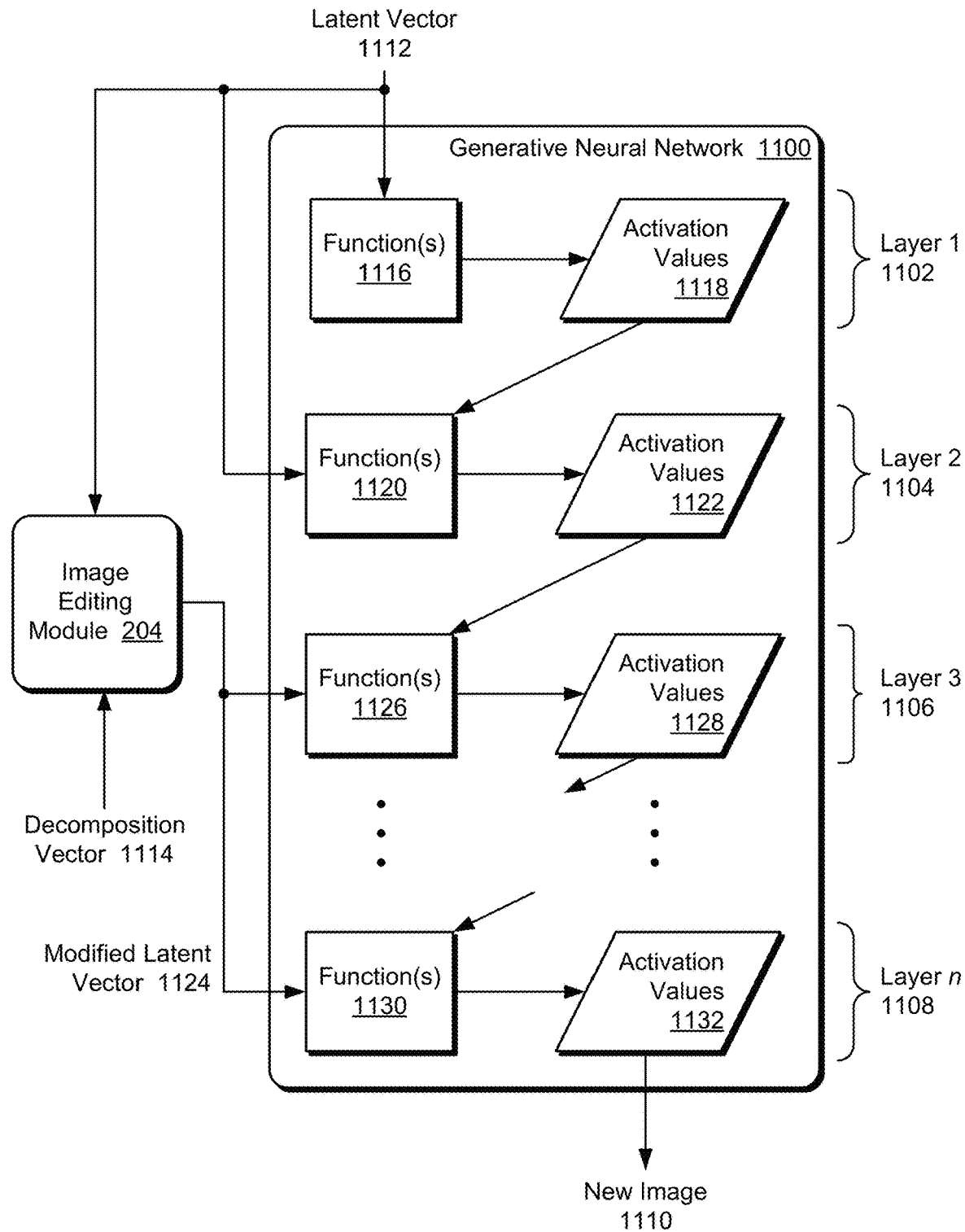
FIG. 11 illustrates another example generative neural network.

FIG. 11 illustrates another example generative neural network 1100. The generative neural network 1100 can be, for example, a generative neural network 104 of FIG. 1 or FIG. 2. The generative neural network 1100 includes multiple (n) layers, illustrated as layers 1102, 1104, 1106, and 1108, and generates a new image 1110. Generally, each layer performs one or more operations or functions on received data, and generates output data referred to as activation values or simply activations, analogous to the layers of the generative neural network 800 of FIG. 8. However, the example generative neural network 1100 differs from the generative neural network 800 of FIG. 8 in that a latent vector 1112 is input to some layers of the generative neural network 1100, but is modified by the image editing module 204 based on a decomposition vector 1114, and a modified latent vector is input to other layers.

To generate a new image 1110, the latent vector 1112 is input to the initial layer 1102. In layer 1102 one or more functions 1116 are performed on the latent vector 1112, which generates various activation values 1118. The activation values 1118 as well as the latent vector 1112 are provided as inputs to layer 1104. In layer 1104 one or more functions 1120 are performed on the activation values 1118 and the latent vector 1112, which generates various activation values 1122. The activation values 1122 are provided as inputs to layer 1106.

The image editing module 204 uses the decomposition vector 1114 to modify the latent vector 1112, and provides the modified latent vector 1124 as input to all layers after layer 1104 (e.g., layers 1106 and 1108). In layer 1106 one or more functions 1126 are performed on the activation values 1122 and the modified latent vector 1124, and the one or more functions 1126 generate various activation values 1128. The activation values 1128 as well as the modified latent vector 1124 are provided as inputs to the next layer. Eventually, the activations from the penultimate layer as well as the modified latent vector 1124 are provided as inputs to the layer 1108. In layer 1108 one or more functions 1130 are performed on the activation values received from the previous layer and the modified latent vector 1124, which generates various activation values 1132. The activation values 1132 are output as the generated new image 1110.

The image editing module 204 can modify the latent vector 1112 based on the decomposition vector 1114 in various manners similar to the discussion above regarding the example of FIG. 8. However, as the decomposition vector 1114 is generated based on a concatenated activation vector and latent vector, the image editing module 204 adds to the latent vector (or subtracts from the latent vector) the portion of the decomposition vector 1114 corresponding to the latent vector. Thus, in the example of FIG. 11, the image editing module 204 modifies the latent vector 1112 and inputs the modified latent vector 1124 into subsequent layers of the generative neural network 1100, but does not modify the activation values generated by any particular layer. This allows, for example, the translation and transformation techniques discussed herein to be performed even in situations in which the activation values in the layers of the generative neural network 1100 are not available to be modified (e.g., situations in which the generative neural network 1100 is implemented in hardware, such as an application specific integrated circuit (ASIC)).

Returning to FIG. 2, the generative neural network control system 106 can be implemented in various different manners as discussed above. In the examples discussed above, a decomposition vector 230 is used to modify one or both of the initial latent vector 220 and activation values 224 at a particular layer at a time. Additionally or alternatively, one or both of the initial latent vector 220 and the activation values 224 can be modified at different layers for generating the image 228. For example, one or both of the initial latent vector 220 and the activation values 224 can be modified after layer 2 of the generative neural network 104 using one decomposition vector 230, and one or both of the initial latent vector 220 and the activation values 224 can be modified after layer 3 of the generative neural network 104 using a different decomposition vector 230. By way of another example, the initial latent vector 220 can be modified after layer 2 of the generative neural network 104 using one decomposition vector 230, and that modified latent vector can be modified after layer 4 of the generative neural network 104 using a different decomposition vector 230.

Additionally or alternatively, one or both of the initial latent vector 220 and the activation values 224 can be modified using multiple different decomposition vectors 230 at the same layer in order to achieve two different effects. For example, one or both of the initial latent vector 220 and the activation values 224 can be modified after layer 2 using one decomposition vector 230, and then one or both of the initial latent vector 220 and the activation values 224 can be further modified after layer 2 using a different decomposition vector 230.

Thus, as can be seen from the discussion herein, the image editing module 204 allows for various editing (such as transformation and translation) to be performed on an image being generated by a generative neural network. The techniques discussed herein are used on a trained generative neural network so additional training or other data is not needed. E.g., additional example images need not be provided to the generative neural network in order to have a particular effect on the image being generated.

Image Cleanup

In one or more implementations, the image editing module 204 implements functionality to clean up the image generated by the generative neural network 104 by removing artifacts, or simplify the image generated by the generative neural network 104 by removing details. In some situations the generative neural network 104 generates visual artifacts as part of the image 228. These visual artifacts are anomalies in the image 228, such as noise, errant colors, and so forth. The image editing module 204 removes artifacts and simplifies images by projecting the activation values from one or more layers of the generative neural network 104 on a linear subspace determined by the decomposition vector determination module 202.

Figure 12:
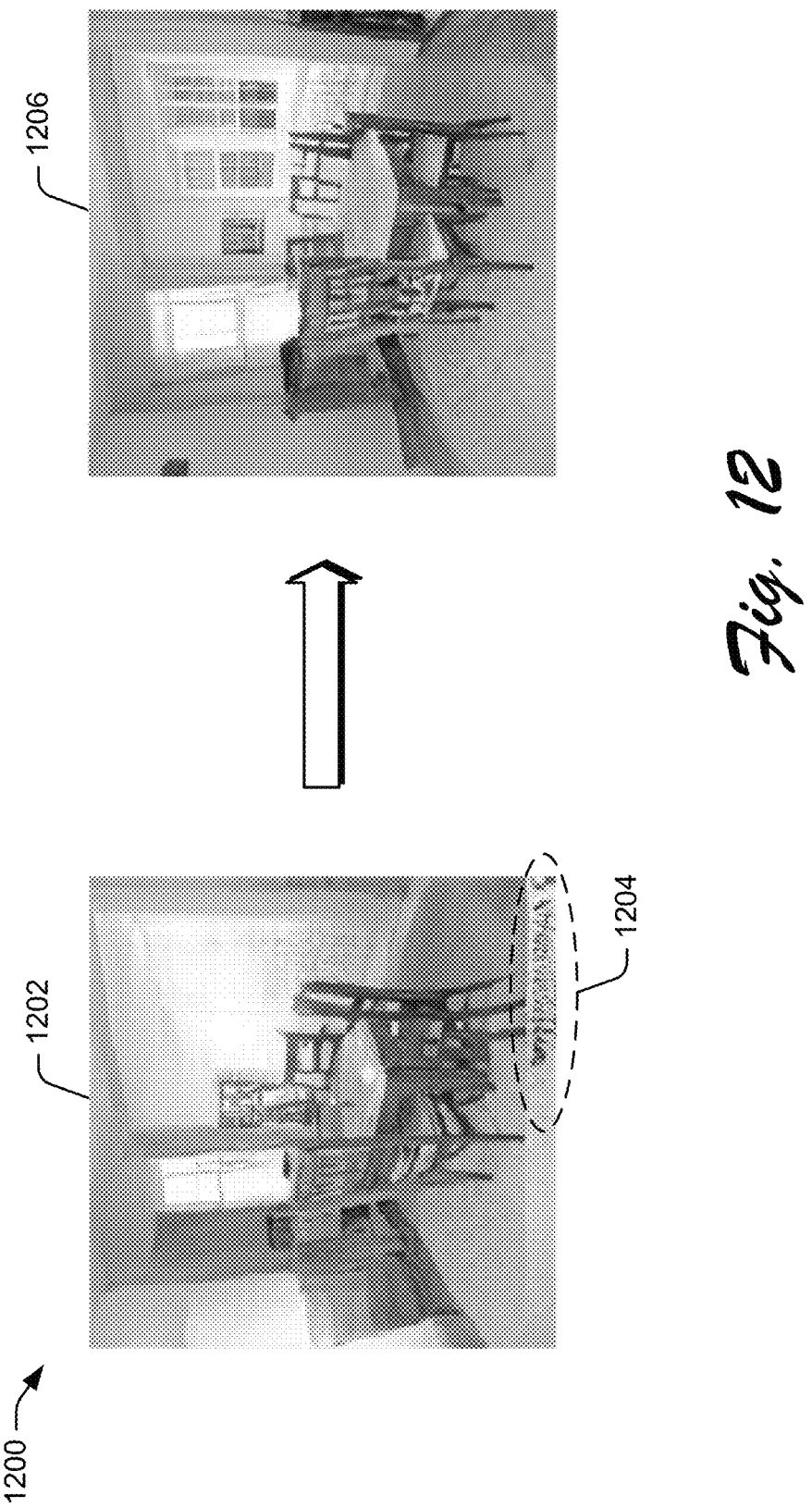
FIG. 12 illustrates an example of removing artifacts from an image.

FIG. 12 illustrates an example 1200 of removing artifacts from an image. The example 1200 illustrates an initial image 1202 of a dining room. Artifacts, illustrated by an ellipse 1204, are present in the lower right corner of the image 1202. A new image 1206 is generated by the generative neural network 104, based on a modified latent vector from the image editing module 204, that removes the artifacts in the image 1202.

Returning to FIG. 2, the image editing module 204 removes artifacts and simplifies images by using multiple decomposition vectors 230 to modify the activation values from one or more layers of the generative neural network 104. The image editing module 204 modifies the activation values by unrolling the activation values from a layer of the generative neural network 104 into an activation vector and creates a modified activation vector by projecting the activation vector on the first N decomposition vectors 230. The image editing module 204 converts the modified activation vector to the same format as the activation values (e.g., a matrix) and provides the modified activation values to the next layer in the generative neural network 104.

For example, referring again to FIG. 8, the activation values 822 are provided as input to the image editing module 204, which modifies the activation values 822 based on multiple decomposition vectors 812. The image editing module 204 unrolls the activation values 822 into an activation vector, and projects the activation vector on the first N decomposition vectors, resulting in a modified activation vector. The image editing module 204 converts the modified activation vector to the same format as the activation values 822 (e.g., a matrix) to generate the modified activation values 824.

By way of another example, referring again to FIG. 9, the activation values 922 are provided as input to the image editing module 204, which modifies the activation values 922 based on multiple decomposition vectors 914. The image editing module 204 unrolls the activation values 922 into an activation vector, and projects the activation vector on the first N decomposition vectors 914, resulting in a modified activation vector. The image editing module 204 converts the modified activation vector to the same format as the activation values 922 (e.g., a matrix) to generate the modified activation values 924.

Returning to FIG. 2, the number N of decomposition vectors 230 onto which the activation vector is projected can vary. In one or more implementations, the number N of decomposition vectors 230 is between 30 and 100, which results in removing artifacts from the image 228. Additionally or alternatively, the number N of decomposition vectors 230 can be less, such as between 10 and 20, to simplify the image 228. Simplifying the image 228 refers to making the image 228 look more like an average image for the class by removing specific details. For example, if the class is dining rooms, then specific details like windows, window coverings, pictures, and so forth may be removed and replaced with a simple undecorated wall.

In one or more implementations, the image editing module 204 replaces all of the activation values input to the next layer with the modified activation values generated by the image editing module 204. For example, the activation values used by the one or more functions 826 of FIG. 8 are the modified activation values 824 generated by the image editing module 204.

Additionally or alternatively, the image editing module 204 replaces only some of the activation values input to the next layer with the modified activation values generated by the image editing module 204. For example, the activation values used by the one or more functions 826 of FIG. 8 are a combination of the modified activation values 824 and the activation values 822. Replacing only some of the activation values 822 with a modified activation value allows the image editing module 204 to apply the cleanup and simplification to only specific spatial regions of the image being generated.

In one or more implementations, each activation value corresponds to a particular portion of the image being generated, such as a particular pixel or collection of pixels (e.g., one activation value may correspond to the 16 pixels in a 4×4 grid in the top right corner of the image being generated). Which activation value corresponds to which portion of the image being generated can be determined in any of a variety of different manners. For example, the activation values can be arranged in a matrix format and the dimension of that matrix can be compared to the dimension of the image 228 to readily determine which portion of the image being generated corresponds to which activation value. This comparison can be performed in various manners, such as automatically by the image editing module 204.

By allowing the image editing module 204 to apply the cleanup and simplification to only specific spatial regions of the image being generated, user input specifying a particular region of the image 228 where an artifact is present or the user desires the image to be simplified can be received. For example, an image 228 can initially be generated by the generative neural network 104. A user touch input can be received that draws a circle or other geometric shape approximately around the artifact, a verbal input specifying a particular portion of the image 228 can be received (e.g., a verbal input of "top right corner" can be received), and so forth.

In response to such a user input, the image editing module 204 determines which portions (e.g., pixels) of the image 228 are identified by the user input, and further determines which of the activation values correspond to the identified portions of the image 228. The image editing module 204 uses the decomposition vectors 230 to modify the activation values that correspond to the identified portions of the image 228. For example, referring again to FIG. 8, the image editing module 204 receives activation values 822 and modifies those of the activation values 822 that correspond to the identified portions of the image 228. The modified activation values 824 provided to the layer 806 include the modified activation values for the activation values 822 that correspond to the identified portions of the image 228, and the activation values 822 (not modified) that correspond to the portions of the image 228 that are not identified by the user input.

As discussed above, different layers of the generative neural network 104 correspond to different amounts by which modification of the activation values or latent vector input have a global or local effect on the image 228. Accordingly, the image editing module 204 can modify activation values at earlier layers (e.g., layer 2 of FIG. 8 or 9) to cleanup or simplify modifications more globally or at later layers (e.g., layer 5 or 6) to cleanup or simplify modifications more locally.

It should be noted that, in situations in which an initial image 228 has already been generated, the latent vector 220 need not be re-input to the generative neural network 104 in order to perform the desired effect. Rather, the activation values from the layers of the generative neural network 104 can have been stored and are accessible to the image editing module 204. Accordingly, the image editing module 204 can retrieve the activation values from one layer as previously generated, modify the activation values as discussed above to cleanup or simplify the image, and provide the modified activation values to the next layer. Thus, new activation values for the next and later layers of the generative neural network 104 will be generated to create a new image, but the previously generated activation values for earlier layers need not be re-generated, improving the performance of the generative neural network 104 and the generative neural network control system 106.

Image Styling

In one or more implementations, the image styling module 206 implements functionality to change a style of the image generated by the generative neural network 104. The style of the image refers to a distinctive appearance of the image, such as a coloration of the image or a background of the image. For example, the style of a generated image can be changed by applying an initial latent vector to a first one or more layers of the generative neural network but applying a different latent vector to a second one or more later layers of the generative neural network. Thus, different latent vectors are applied to different layers of the generative neural network. However, the activation values between layers need not be modified (although can be modified to produce additional effects as discussed herein).

By freezing the activations of the early layers using the initial latent vector, the spatial structure of the generated image remains consistent. However, by changing the activations of the later layers as a result of the new latent vector, additional aspects such as texture and color (e.g., which can be referred to as a style of the generated image) can be added or changed. The higher the number of earlier layers using the initial latent vector, the less varied the generated images will be (e.g., the more consistent the geometry of the generated images will be), allowing the user to control the degree of randomization by selecting the number of earlier layers. E.g., changing to a new latent vector at an earlier layer (e.g., layer 2) results in more changes in the geometry or spatial structure of the generated images (e.g., the shape of a dog being generated) whereas changing to a new latent vector at a later layer (e.g., layer 5) results in changing the lighting conditions of the generated images or changes in the background of the generated images (e.g., from a grassy or sandy background to a snowy background).

FIG. 13 illustrates an example 1300 of changing the style of a generated image. The example 1300 illustrates an initial image 1302 of a dog, generated using an initial latent vector. A new image 1304 is generated by the generative neural network 104, based on a new latent vector generated by the image styling module 206 and input to later layers of the generative neural network 104, that changes the background of the image but leaves the dog approximately the same. Similarly, a new image 1306 is generated by the generative neural network 104, based on another new latent vector generated by the image styling module 206 and input to later layers of the generative neural network 104, that further changes the background of the image but leaves the dog approximately the same.

Figure 14:
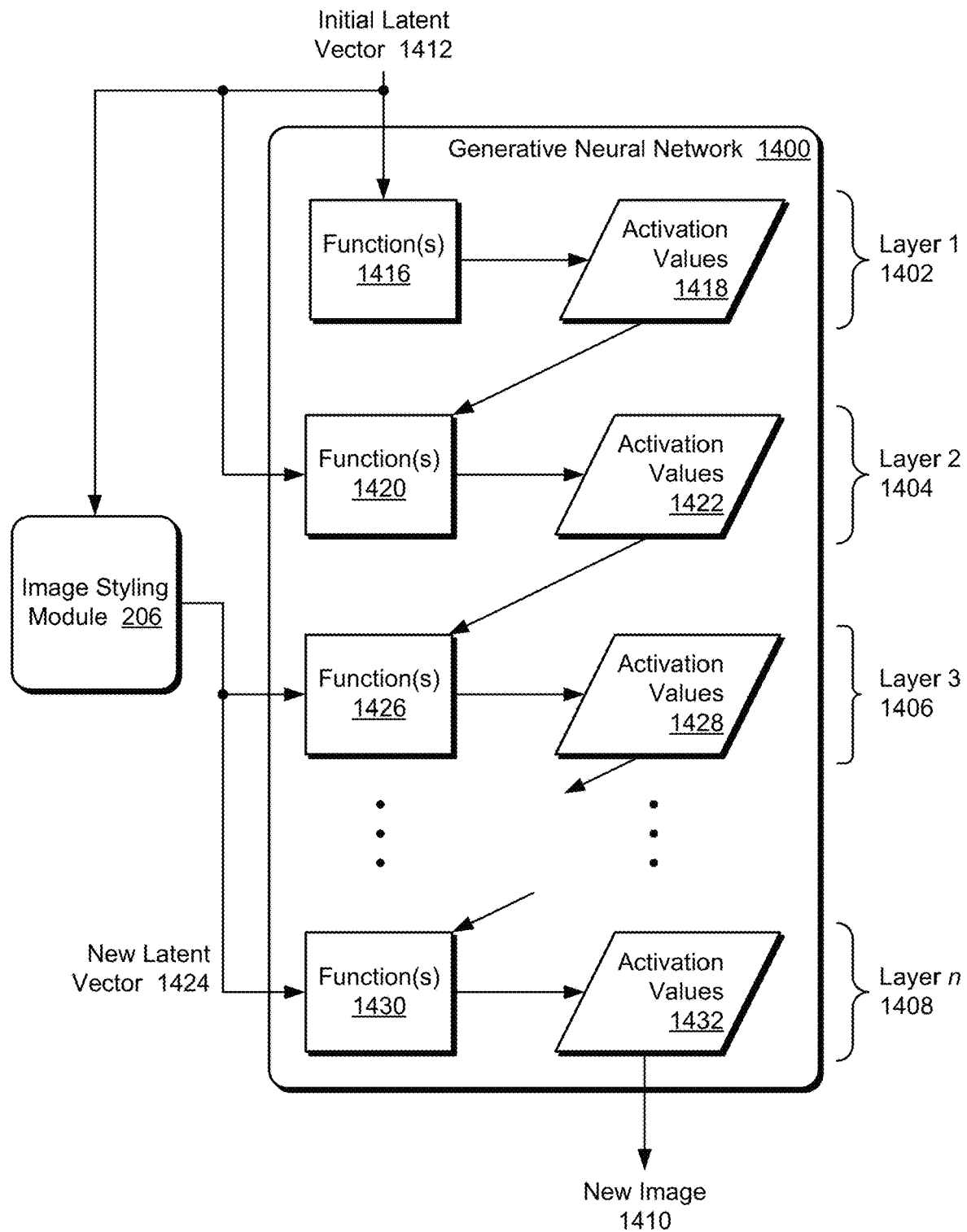
FIG. 14 illustrates another example generative neural network.

FIG. 14 illustrates another example generative neural network 1400. The generative neural network 1400 can be, for example, a generative neural network 104 of FIG. 1 or FIG. 2. The generative neural network 1400 includes multiple (n) layers, illustrated as layers 1402, 1404, 1406, and 1408, and generates a new image 1410. Generally, each layer performs one or more operations or functions on received data, and generates output data referred to as activation values or simply activations, analogous to the layers of the generative neural network 800 of FIG. 8. However, the example generative neural network 1400 differs from the generative neural network 800 of FIG. 8 in that an initial latent vector 1412 is input to one or more earlier layers of the generative neural network 1400, but a new latent vector 1424 is input to one or more later layers. Earlier layers of the generative neural network 1400 refer to layers of the generative neural network 1400 closer to the initial latent vector 1412 input than later layers, and later layers of the generative neural network 1400 refer to layers of the generative neural network 1400 closer to the new image 1410 output than earlier layers.

To generate a new image 1410, the initial latent vector 1412 is input to the first layer 1402. In layer 1402 one or more functions 1416 are performed on the initial latent vector 1412, which generates various activation values 1418. The activation values 1418 as well as the initial latent vector 1412 are provided as inputs to layer 1404. In layer 1404 one or more functions 1420 are performed on the activation values 1418 and the initial latent vector 1412, which generates various activation values 1422. The activation values 1422 are provided as inputs to layer 1406.

The image styling module 206 generates a new latent vector 1424. The image styling module 206 can generate a new latent vector 1424 in any of a variety of different manners, such as randomly, pseudorandomly, according to other rules or criteria, and so forth. It should be noted that the image styling module 206 need not base generation of the new latent vector 1424 on the decomposition vectors 230 of FIG. 2. In situations in which the initial latent vector 1412 includes a class vector, the image styling module 206 typically includes that same class vector in the new latent vector 1424. Additionally or alternatively, the image styling module 206 can generate a new class vector (such as randomly, pseudorandomly, according to other rules or criteria, and so forth) to include in the new latent vector 1424.

The image styling module 206 provides the new latent vector 1424 as input to all layers after layer 1404 (e.g., layers 1406 and 1408). In layer 1406 one or more functions 1426 are performed on the activation values 1422 and the new latent vector 1424, and the one or more functions 1426 generate various activation values 1428. The activation values 1428 as well as the new latent vector 1424 are provided as inputs to the next layer. Eventually, the activations from the penultimate layer as well as the new latent vector 1424 are provided as inputs to the layer 1408. In layer 1408 one or more functions 1430 are performed on the activation values received from the previous layer and the new latent vector 1424, which generates various activation values 1432. The activation values 1432 are output as the generated new image 1410.

This process can be repeated multiple times with the image styling module 206 generating a different new latent vector 1424 each time, resulting in different new images 1410 with different styles being generated. Additionally, although FIG. 14 illustrates an example with the initial latent vector 1412 being provided to layers 1402 and 1404, and the new latent vector 1424 being provided to layers 1406 and later, the initial latent vector 1412 rather than the new latent vector 1424 can be provided to additional layers (e.g., layer 1404).

It should be noted that, in the example of FIG. 14, the image styling module 206 generates and inputs the new latent vector 1424 into subsequent layers of the generative neural network 1400, but does not modify the activation values generated by any particular layer. This allows, for example, the discussed herein to be performed even in situations in which the activation values in the layers of the generative neural network 1400 are not available to be modified (e.g., situations in which the generative neural network 1400 is implemented in hardware, such as an ASIC).

Composite Images

The image composition module 208 implements functionality to have the generative neural network 104 generate an image that is a composite of two other images. Such a composite image is generated by having the generative neural network 104 generate two images, also referred to as source images. These source images can be generated with any of the effects discussed herein, such as transformation, translations, style changes, and so forth.

The activation values for image composition module 208 receives, for each of the two source images, the activation values for the two-source image from a particular layer of the generative neural network 104. The image composition module 208 combines these activations in various manners, such as by using different parts of the activation values from the different source images, by interpolating activation values, and so forth as discussed in more detail below. These combined activation values are then input to the next layer of the generative neural network 104, which proceeds to generate the composite image.

Figure 15:
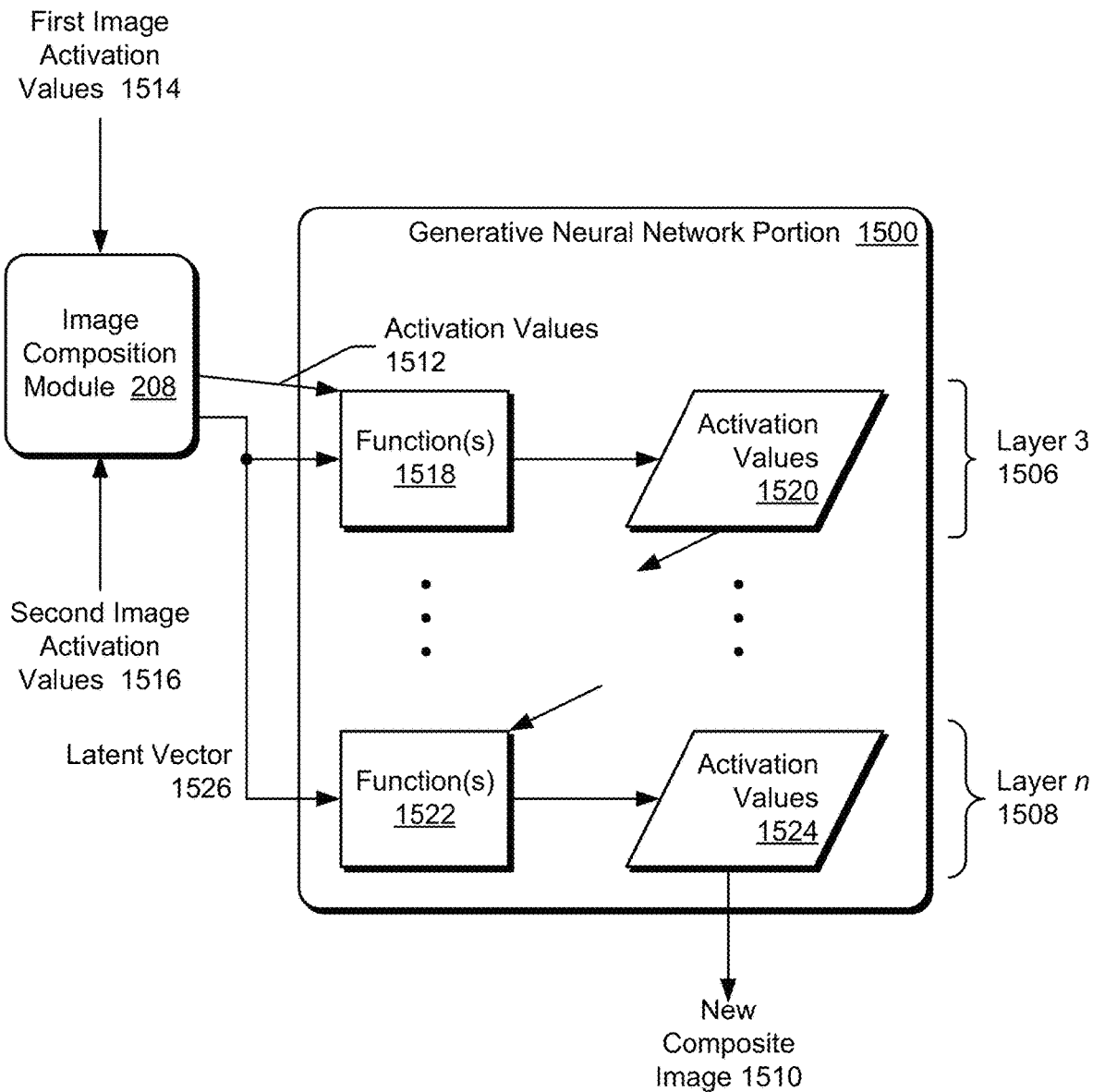
FIG. 15 illustrates an example of generating a component image.

FIG. 15 illustrates an example of generating a component image. FIG. 15 includes a portion 1500 of a generative neural network, such as a portion of a generative neural network 104 of FIG. 1 or FIG. 2. The generative neural network 1500 includes multiple layers, illustrated as layers 1506 and 1508, and generates a new composite image 1510. The generative neural network 1500 optionally includes additional layers earlier than layer 1506, although the activation values generated by those earlier layers are not used in generating the new composite image 1510 and thus need not be included in the portion 1500.

Generally, each layer performs one or more operations or functions on received data, and generates output data referred to as activation values or simply activations, analogous to the layers of the generative neural network 300 of FIG. 3. In the example of FIG. 15, the image cleanup module 208 generates activation values 1512 based on activation values 1514 received from the generative neural network 104 generating a first image, and activation values 1516 received from the generative neural network 104 generating a second image. The activation values 1514 and 1516 can be received from the same generative neural network 104 or alternatively different generative neural networks.

To generate a new composite image 1510, the image composition module 208 uses the activation values 1514 and 1516 from the previously generated first and second images to generate the activation values 1512, and provides the activation values 1512 as input to the layer 1506. In layer 1506 one or more functions 1518 are performed on the activation values 1512, and the one or more functions 1518 generate various activation values 1520. The activation values 1520 are provided as inputs to the next layer. Eventually, the activations from the penultimate layer are provided as inputs to the layer 1508. In layer 1508 one or more functions 1522 are performed on the activation values received from the previous layer, which generates various activation values 1524. The activation values 1524 are output as the generated new composite image 1510.

In one or more implementations, the activation values 1514 and 1516 are received from a particular layer of the generative neural network 104 for two different initial latent vectors 220. These activation values 1514 and 1516 are the activation values generated from the same layer as the layer prior to the layer 1506 (e.g., layer 2 in the illustrated example of FIG. 15). The image composition module 208 can operate on the activation values 1514 and 1516 as received (e.g., in matrix form). Additionally or alternatively, the image composition module 208 can unroll the activation values 1514 into a first image activation vector and unroll the activation values 1516 into a second image activation vector, and operate on these activation vectors.

The image composition module 208 can generate the activation values 1512 based on the first image activation values 1514 and the second image activation values 1516 in various manners in order to generate different effects for the new composite image 1510. In one or more implementations, the image composition module 208 combines the first image activation values 1514 with the second image activation values 1516 to generate the activation values 1512. This combination is performed by selecting activation values from a portion of the first image activation values 1514 and using, as the corresponding activation values in the activation values 1512, those selected activation values. Similarly, activation values from a portion of the second image activation values 1516 are selected and used as the corresponding activation values in the modified activation values 1512.

Figure 16:
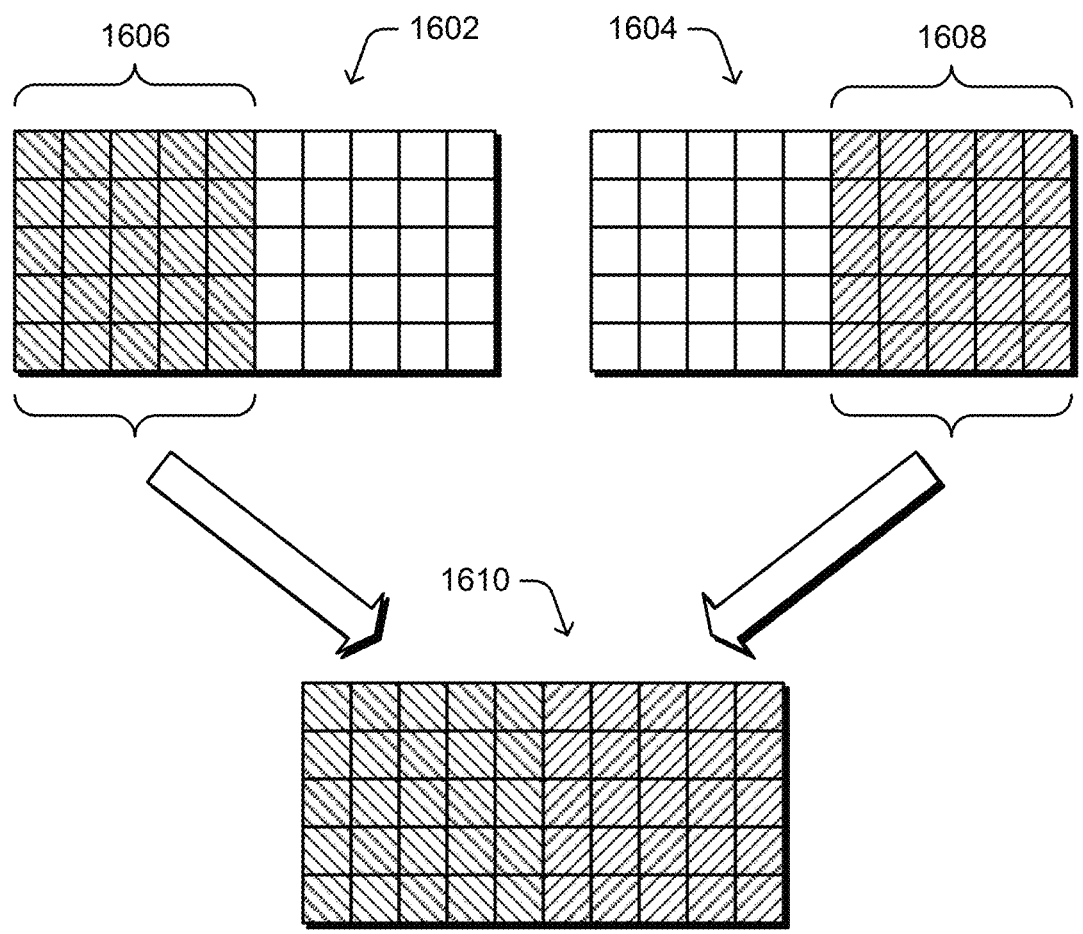
FIG. 16 illustrates an example of combining first and second image activation values.

FIG. 16 illustrates an example of combining the first and second image activation values. FIG. 16 illustrates a simplified example where the activation values are arranged in a 10 by 5 matrix. First image activation values 1602 obtained from a layer of the generative neural network 104 for a first initial latent vector 220 and second image values 1604 obtained from the same layer of the generative neural network 104 for a second initial latent vector 220 are illustrated. A portion 1606 of the activation values 1602, illustrated with diagonal lines from top left to bottom right, is selected to be combined with a portion 1608 of the activation values 1604, illustrated with diagonal lines from bottom left to top right. Modified activation values 1610 are generated by using the activation values in these portions 1606 and 108 as illustrated.

Although illustrated as using the left half of the activation values 1602 for the left half of the activation values 1610 and the right half of the activation values 1604 for the right half of the activation values 1610, these can be reversed. E.g., the right half of the activation values 1602 can be used for the left half of the activation values 1610 and the left half of the activation values 1604 can be used for the right half of the activation values 1610, these can be reversed.

Returning to FIG. 15, portions of the two activation values 1514 and 1516 are combined to generate the activation values 1512. The two portions can be any of a variety of different geometric shapes. For example, each portion can be approximately half of the activation values (e.g., the top half and left half, the bottom half and right half). By way of another example, each portion can be approximately one-quarter of the activation values (e.g., the top right quarter, the top left quarter, the bottom left quarter, and the bottom right quarter). By way of another example, one portion can be a circular region in the center of the activation values and the second portion can be the remaining area of the activation values.

In one or more implementations, the portions of the activation values from the two source images are user-selected. This can be user selection of pre-determined portions (e.g., halves or quarters as discussed above) or user selection of any of a variety of geometric shapes. For example, a user touch input can be received that draws a circle or other geometric shape on one of the source images. In response to such a user input, the image composition module 208 determines which portions (e.g., pixels) of the source image are identified by the user input, and further determines which of the activation values correspond to the identified portions of the source image, analogous to the discussion above regarding receiving user selection of an artifact. These activation values generated from the initial latent vector for that source image are thus the portion of that source image used as the modified activation values. The remaining activation values in the modified activation values are those activation values from the other source image.

In one or more implementations, the style of the new composite image 1510 is changed by providing a latent vector 1526 to the layers of the generative neural network portion 1500 analogous to the discussion above. Accordingly, the latent vector 1526 controls the style of the new composite image 1510, and the combining of the activation values controls the layout and content of the new composite image 1510. In the illustrated example of FIG. 15, these later layers are layers 1506 and later. The image composition module 208 generates the latent vector 1526 based on the latent vectors input to the later layers of the generative neural network used to generate the source images, also referred to herein as the source latent vectors. The image composition module 208 combines the source latent vectors to create the latent vector 1526.

The source latent vectors can be combined in various different manners. In one or more implementations, the latent vector 1526 is generated by interpolating between the source latent vectors, such as using linear interpolation, spherical interpolation, and so forth. This provides, for example, a style for the new composite image 1510 that is set to the mean of the source latent vectors.

Additionally or alternatively, the source latent vectors can be combined in different manners. For example, user input specifying how heavily to weigh each of the source latent vectors can be received by the image composition module 208. E.g., the user can specify that the style should be 75% of the first source image and 25% of the second source image. The image composition module 208 then uses a weighted combination of the source latent vectors that corresponds to the user input. E.g., following the previous example, the image composition module 208 generates the latent vector 1526 by summing 75% of the source latent vector corresponding to the first source image and 25% of the source latent vector corresponding to the second source image.

Additionally or alternatively, the source latent vectors need not both be combined. For example, a random number can be used in place of one or more of the source latent vectors, resulting in a new style analogous to the discussion above. Accordingly, in such situations the image composition module 208 need not receive one or more of the activation values 1514 and 1516.

Analogous to the discussions above, the image composition module 208 can provide the activation values for any of a variety of different layers of the generative neural network 104. Earlier layers correspond to global changes in the new composite image 1510, resulting in a more progressive and transition that is more natural to the human eye. Later layers correspond to local changes with a less natural transition (e.g., appearing to have been two images cut by scissors and glued together). Accordingly, how sharp the transition is between the source images is controlled (e.g., by user input) by selecting a different layer of the generative neural network 104 for which to modify the activation values.

Although discussed herein as combining two images, it should be noted that any number of images can be analogously combined to generate the new composite image 1510.

Figure 17:
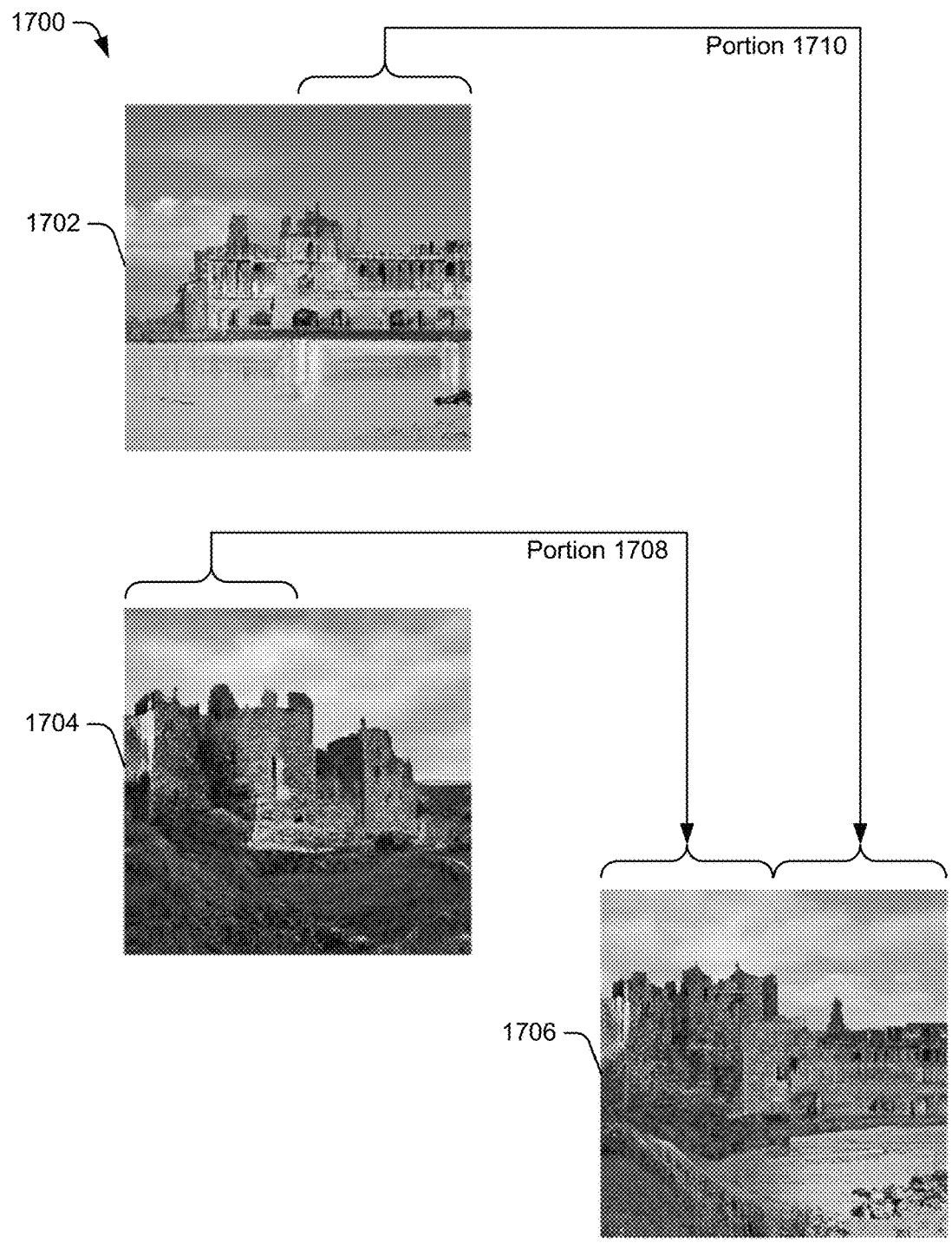
FIG. 17 illustrates another example of generating a composite image.

FIG. 17 illustrates an example 1700 of generating a composite image. The example 1700 illustrates two source images 1702 and 1704. A new composite image 1706 is generated by the generative neural network 104, based on activation values generated by the image composition module 208 and input to certain layers of the generative neural network 104 as discussed above. As illustrated, a left portion 1708 of the image 1704 is the basis for the left portion of the new composite image 1706, and a right portion 1710 of the image 1702 is the basis for the right portion of the new composite image 1710.

Returning to FIG. 15, the image composition module 208 can optionally generate the activation values 1512 based on the first image activation values 1514 and the second image activation values 1516 in other manners. In one or more implementations, the image composition module 208 combines the first image activation values 1514 and the second image activation values 1516 by linearly interpolating between the activation values 1514 and 1516. Each value in the activation values 1512 is generated by interpolating the corresponding values in the first image activation values 1514 and the second image activation values 1516, such as using linear interpolation, spherical interpolation, and so forth.

Additionally or alternatively, the image composition module 208 can generate the activation values 1512 in other manners. For example, user input specifying how heavily to weigh each of the source images can be received by the image composition module 208. E.g., the user can specify that the style should be based 75% on the first source image and 25% on the second source image. The image composition module 208 then uses a weighted combination of the activation values 1514 and the activation values 1516 that corresponds to the user input. E.g., following the previous example, the image composition module 208 generates each value of the activation values 1512 by summing 75% of the corresponding value in the first image activation values 1514 and 25% of the corresponding value in the second image activation values 1516.

This combining of the activation values 1514 and 1516, e.g., so that each one of the activation values 1512 is based on at least part of the corresponding value of the activation values 1514 and the corresponding value of the activation values 1516, hybrid images can be generated. These hybrid images provide a combination, in all areas of the image, of the corresponding source images.

In one or more implementations, the style of the new composite image 1510 is changed by providing a latent vector 1526 to the later layers of the generative neural network portion 1500 analogous to the discussion above. Accordingly, the latent vector 1526 controls the style of the new composite image 1510, and the combining of the activation values controls the layout and content of the new composite image 1510. In the illustrated example of FIG. 15, these later layers are layers 1506 and later. The new latent vector 1526 is generated based on the latent vectors input to the later layers of the generative neural network used to generate the source images, also referred to herein as the source latent vectors. The image composition module 208 combines the source latent vectors to create the latent vector 1526.

As discussed above, the source latent vectors can be combined in various different manners. In one or more implementations, the latent vector 1526 is generated by linearly interpolating between the source latent vectors, such as using linear interpolation, spherical interpolation, and so forth. Additionally or alternatively, the source latent vectors can be combined in different manners. For example, user input specifying how heavily to weigh each of the source latent vectors can be received by the image composition module 208 and used to generate the latent vector 1526. Additionally or alternatively, the source latent vectors need not both be combined. For example, a random number can be used in place of one or more of the source latent vectors.

Figure 18:
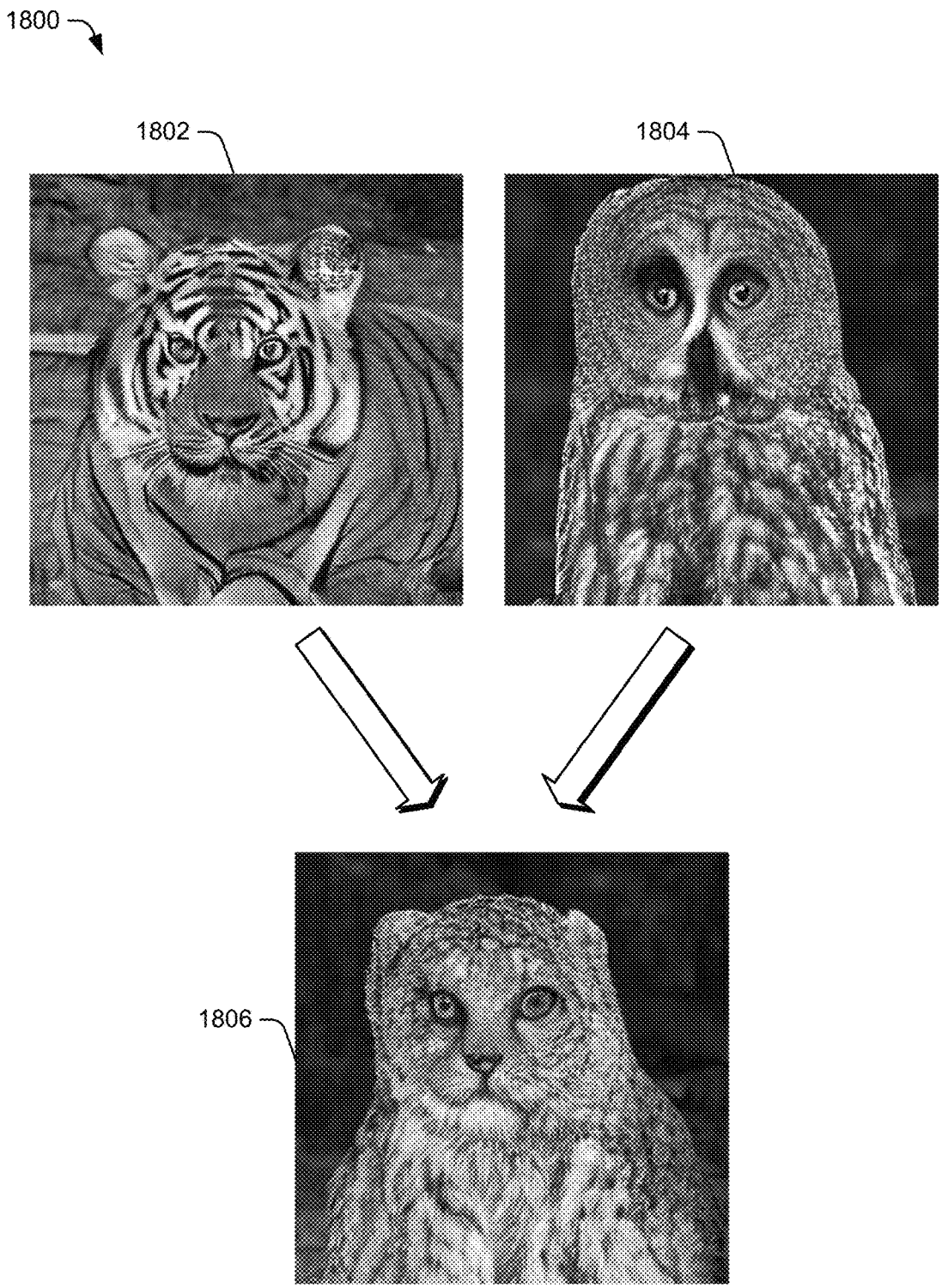
FIG. 18 illustrates another example of generating a composite image.

FIG. 18 illustrates another example 1800 of generating a composite image. The example 1800 illustrates two source images 1802 and 1804. The source image 1802 is generated using a class vector of "tiger" and the source image 1804 is generated using a class vector of "owl". A new composite image 1806 is generated by the generative neural network 104, based on activation values generated by the image composition module 208 and input to certain layers of the generative neural network 104 as discussed above. As illustrated, the new composite image 1806 is a hybrid image that is a combination of the tiger of the image 1802 and the owl of the image 1804.

Returning to FIG. 15, it should be noted that the same or different latent vectors can be used as the input latent vectors when generating the source images. Using the same input latent vectors for the source images typically results in better alignment of the objects in the source images, although different input latent vectors can be used. Additionally, the same or different class vectors can be used as the input class vectors when generating the source images depending on the desired effect.

Returning to FIG. 2, it should be noted that any of the various techniques discussed herein can be combined. For example, various translation, transformation cleanup, simplification, and so forth techniques discussed with respect to the image editing module 204 can be performed in conjunction with the effects discussed with respect to one or both of the image styling module 206 and the image composition module 208. These different techniques can be performed at the same level of the generative neural network 104 or different levels. For example, various translation, transformation cleanup, simplification, and so forth techniques discussed with respect to the image editing module 204 can be performed at one layer while the effects discussed with reference to one or both of the image styling module 206 and the image composition module 208 can be performed at a different layer of the generative neural network 104.

It should further be noted that in situations where an image has been generated and the intermediate latent space between layer X and layer X+1 is being modified when generating a new image, the previously generated activation values for layer X and earlier layers can be, but need not be, regenerated. Rather, the previously generated activation values for layer X and earlier layers can have been previously stored so that they can be retrieved when generating the new image.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-18.

Figure 19:
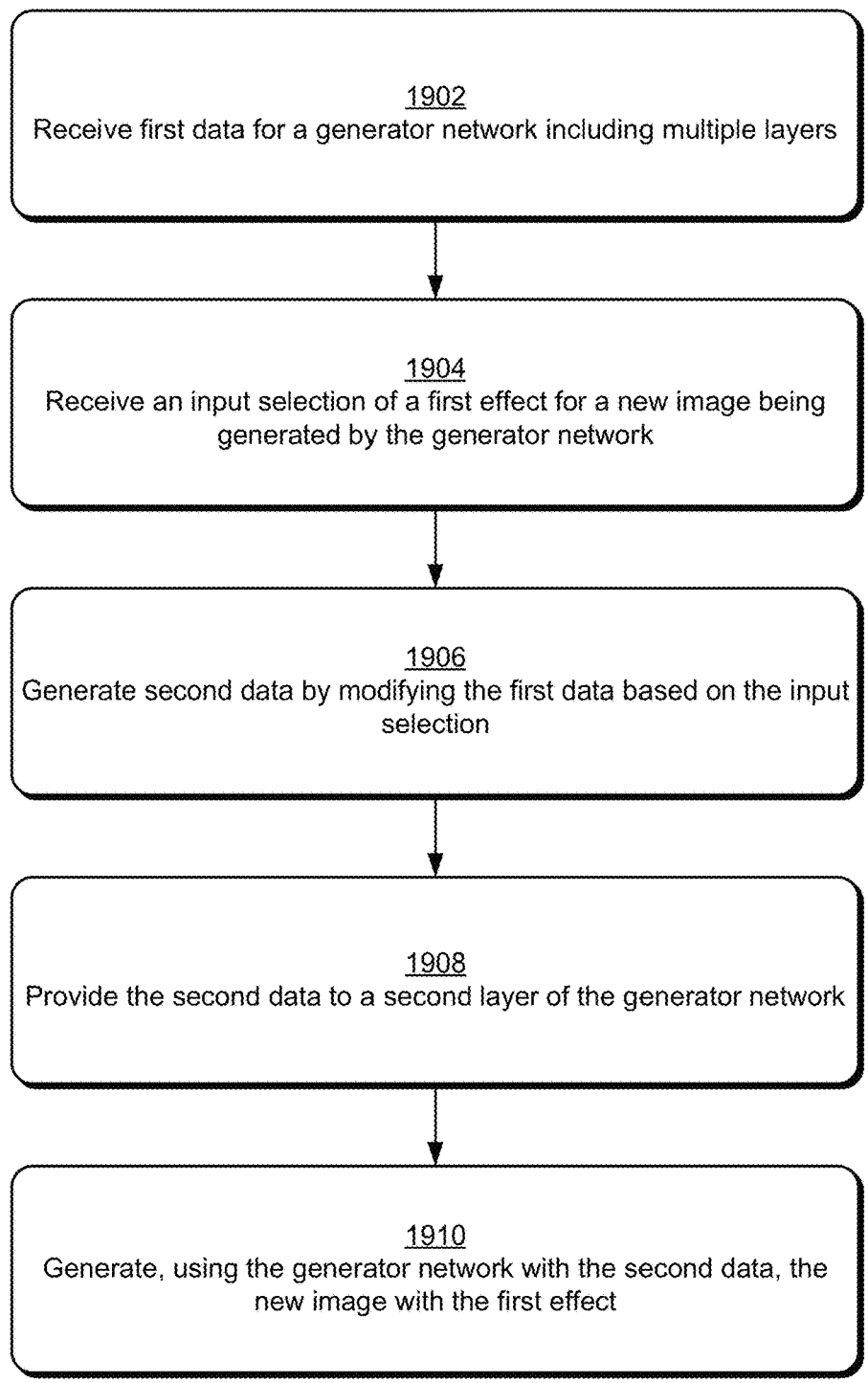
FIG. 19 is a flow diagram depicting a procedure in an example implementation of controlling a neural network through intermediate latent spaces.

FIG. 19 is a flow diagram 1900 depicting a procedure in an example implementation of controlling a neural network through intermediate latent spaces. In this example, first data for a generator network multiple layers is received (block 1902). The generator network is, for example, at least the generator portion of a GAN. The multiple layers of the generator network include an initial layer, a first layer, and a second layer. The first layer is later in the generator network than the initial layer (an input layer), and the second layer is later in the generator network than the first layer. The first data comprises, for example, a latent vector input to the initial layer of the generator network or activation values generated by the first layer of the generator network.

An input selection of a first effect for a new image being generated by the generator network is received (block 1904). This input selection can be, for example, a user selection or user request, a selection or request from another device or system, and so forth.

Second data is generated by modifying the first data based on the input selection (block 1906). This modifying comprises modifying a latent vector input to the initial layer or modifying activation values generated by the first layer, such as by applying decomposition vectors to the activation values generated by the first layer, applying decomposition vectors to the latent vector input to the initial layer, interpolating activation values generated by the first layer from two source image latent vectors, selecting from activation values generated by the first layer from two source image latent vectors, or any combination thereof.

The second data is provided to the second layer (block 1908). For example, the second data is provided to the second layer rather than the first data.

Using the generator network with the second data, the new image with the first effect is generated (block 1910). Although a first effect is discussed, multiple effects can be applied to the new image as discussed above.

Example System and Device

Figure 20:
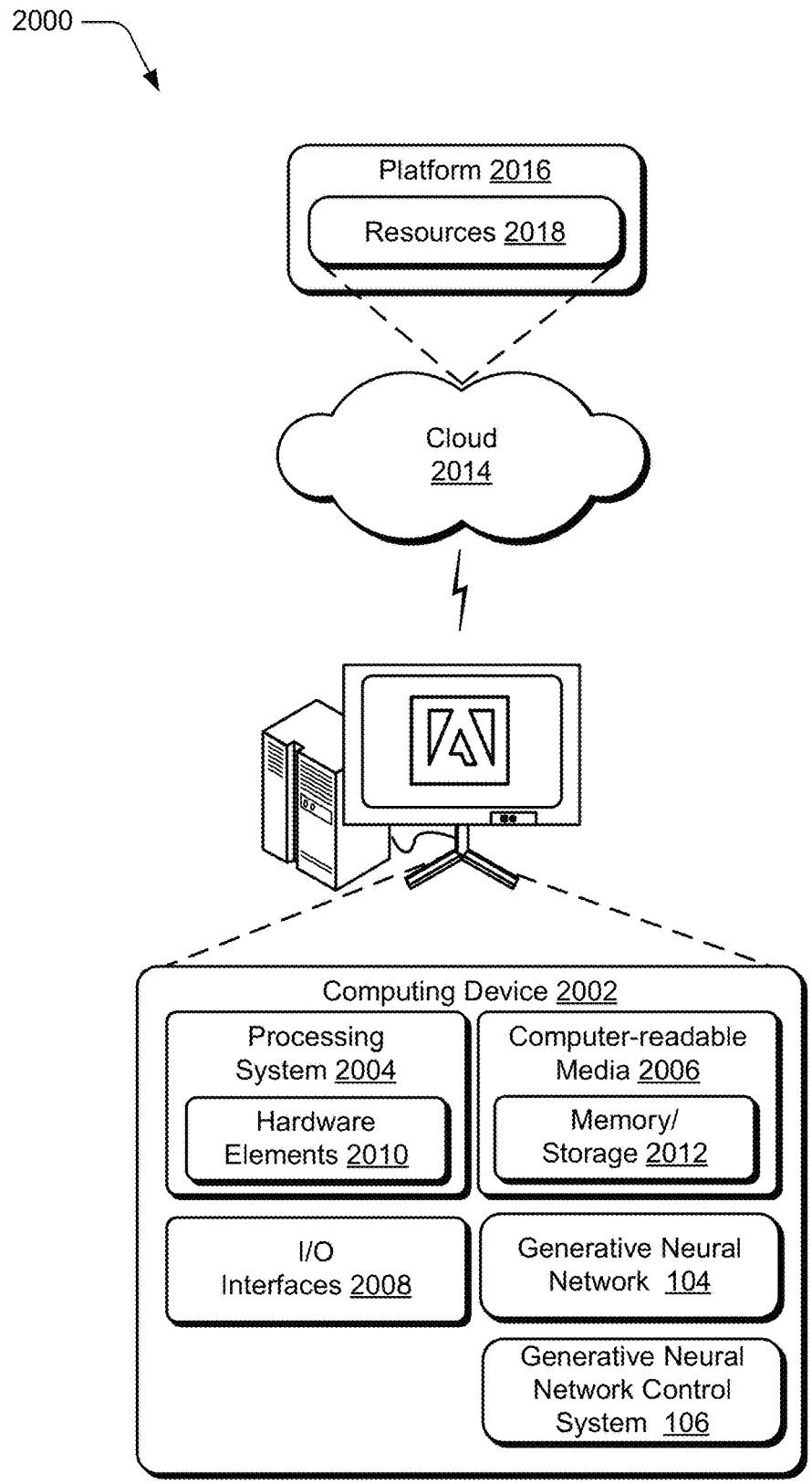
FIG. 20 illustrates an example system including various components of an example device that can be implemented as any type of computing device as described and/or utilized with reference to FIGS. 1-19 to implement aspects of the techniques described herein.

FIG. 20 illustrates an example system generally at 2000 that includes an example computing device 2002 that is representative of one or more computing systems and/or devices that may implement the various techniques described herein. This is illustrated through inclusion of the generative neural network 104 and the generative neural network control system 106. The computing device 2002 may be, for example, a server of a service provider, a device associated with a client (e.g., a client device), an on-chip system, and/or any other suitable computing device or computing system.

The example computing device 2002 as illustrated includes a processing system 2004, one or more computer-readable media 2006, and one or more I/O interface 2008 that are communicatively coupled, one to another. Although not shown, the computing device 2002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2004 is representative of functionality to perform one or more operations using hardware. Accordingly, the processing system 2004 is illustrated as including hardware element 2010 that may be configured as processors, functional blocks, and so forth. This may include implementation in hardware as an application specific integrated circuit or other logic device formed using one or more semiconductors. The hardware elements 2010 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2006 is illustrated as including memory/storage 2012. The memory/storage 2012 represents memory/storage capacity associated with one or more computer-readable media. The memory/storage component 2012 may include volatile media (such as RAM) and/or nonvolatile media (such as read only memory (ROM), Flash memory, optical disks, magnetic disks, and so forth). The memory/storage component 2012 may include fixed media (e.g., RAM, ROM, a fixed hard drive, and so on) as well as removable media (e.g., Flash memory, a removable hard drive, an optical disc, and so forth). The computer-readable media 2006 may be configured in a variety of other ways as further described below.

Input/output interface(s) 2008 are representative of functionality to allow a user to enter commands and information to computing device 2002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2002. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 2002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2010 and computer-readable media 2006 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2010. The computing device 2002 may be configured to implement particular instructions and/or functions corresponding to the software and/or hardware modules. Accordingly, implementation of a module that is executable by the computing device 2002 as software may be achieved at least partially in hardware, e.g., through use of computer-readable storage media and/or hardware elements 2010 of the processing system 2004. The instructions and/or functions may be executable/operable by one or more articles of manufacture (for example, one or more computing devices 2002 and/or processing systems 2004) to implement techniques, modules, and examples described herein.

The techniques described herein may be supported by various configurations of the computing device 2002 and are not limited to the specific examples of the techniques described herein. This functionality may also be implemented all or in part through use of a distributed system, such as over a "cloud" 2014 via a platform 2016 as described below.

The cloud 2014 includes and/or is representative of a platform 2016 for resources 2018. The platform 2016 abstracts underlying functionality of hardware (e.g., servers) and software resources of the cloud 2014. The resources 2018 may include applications and/or data that can be utilized while computer processing is executed on servers that are remote from the computing device 2002. Resources 2018 can also include services provided over the Internet and/or through a subscriber network, such as a cellular or Wi-Fi network.

The platform 2016 may abstract resources and functions to connect the computing device 2002 with other computing devices. The platform 2016 may also serve to abstract scaling of resources to provide a corresponding level of scale to encountered demand for the resources 2018 that are implemented via the platform 2016. Accordingly, in an interconnected device embodiment, implementation of functionality described herein may be distributed throughout the system 2000. For example, the functionality may be implemented in part on the computing device 2002 as well as via the platform 2016 that abstracts the functionality of the cloud 2014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
   receiving an initial latent vector for a generative neural network, the generative neural network having multiple layers including an initial layer, a first layer and a second layer;
   providing the initial latent vector to the initial layer and the first layer;
   generating an additional latent vector;
   providing the additional latent vector to the second layer, the second layer being a later layer in the generative neural network than the first layer; and
   generating, using the generative neural network with the initial latent vector and the additional latent vector, an image.

2. The method of claim 1, wherein the generative neural network is part of a generative adversarial network (GAN).

3. The method of claim 1, wherein the generating the additional latent vector comprises randomly generating the additional latent vector.

4. The method of claim 1, wherein the initial latent vector and the additional latent vector include a same class vector.

5. The method of claim 1, wherein the initial latent vector includes a first class vector, the method further comprising:
   generating an additional class vector; and
   including the additional class vector as part of the additional latent vector.

6. The method of claim 1, further comprising providing the additional latent vector to one or more additional layers that are later layers in the generative neural network than the second layer.

7. A computing device comprising:
   a processor; and
   computer-readable storage media having stored thereon multiple instructions of an application that, responsive to execution by the processor, cause the processor to perform operations including:
   receiving an initial latent vector for a generative neural network, the generative neural network having multiple layers including an initial layer, a first layer and a second layer;
   providing the initial latent vector to the initial layer and the first layer;
   generating an additional latent vector;
   providing the additional latent vector to the second layer, the second layer being a later layer in the generative neural network than the first layer; and
   generating, using the generative neural network with the initial latent vector and the additional latent vector, an image.

8. The computing device of claim 7, wherein the generative neural network is part of a generative adversarial network (GAN).

9. The computing device of claim 7, wherein the generating the additional latent vector comprises randomly generating the additional latent vector.

10. The computing device of claim 7, wherein the initial latent vector and the additional latent vector include a same class vector.

11. The computing device of claim 7, wherein the initial latent vector includes a first class vector, the operations further including:
    generating an additional class vector; and
    including the additional class vector as part of the additional latent vector.

12. The computing device of claim 7, operations further including providing the additional latent vector to one or more additional layers that are later layers in the generative neural network than the second layer.

13. A method implemented by at least one computing device, the method comprising:
    receiving a first latent vector corresponding to a first source image for a generative neural network, the generative neural network having multiple layers including an initial layer, a first layer and a second layer, the second layer being a later layer in the generative neural network than the first layer;
    generating, using the generative neural network with the first latent vector, first activation values by the first layer;
    receiving a second latent vector corresponding to a second source image for the generative neural network;
    generating, using the generative neural network with the second latent vector, second activation values by the first layer;
    obtaining third activation values by selecting a portion of the first activation values;
    obtaining fourth activation values by selecting a portion of the second activation values;
    providing the third activation values and the fourth activation values to the second layer of the generative neural network; and
    generating, using the generative neural network with the third activation values and the fourth activation values, a new image that is a composite of the first source image and the second source image.

14. The method of claim 13, wherein the generative neural network is part of a generative adversarial network (GAN).

15. The method of claim 13, wherein the portion of the first activation values is less than all of the first activation values, and the portion of the second activation values is less than all of the second activation values.

16. The method of claim 13, further comprising receiving a user input selecting the portion of the first activation values and the portion of the second activation values.

17. The method of claim 13, further comprising:
    generating a third latent vector based on the first latent vector and the second latent vector; and
    providing the third latent vector to the second layer of the generative neural network.

18. The method of claim 13, further comprising:
    receiving a third latent vector corresponding to a third source image for the generative neural network;
    generating, using the generative neural network with the third latent vector, fifth activation values by the first layer;
    obtaining sixth activation values by selecting a portion of the fifth activation values; and
    wherein the providing comprises providing the third activation values, the fourth activation values, and the sixth activation values to the second layer of the generative neural network.

19. The method of claim 13, wherein the providing the third activation values and the fourth activation values comprises providing a weighted combination of the third activation values and fourth activation values to the second layer of the generative neural network, and wherein the weights of the third activation values are different than weights of the fourth activation values.

20. The method of claim 19, further comprising receiving a user input specifying the weights of the third activation values and the weights of the fourth activation values.

* * * * *